United States Patent
Cohn et al.

(10) Patent No.: US 9,571,624 B2
(45) Date of Patent: Feb. 14, 2017

(54) APPARATUS, SYSTEM AND METHOD OF TERMINATING A DOCKING SESSION BETWEEN A MOBILE DEVICE AND A DOCKING DEVICE

(71) Applicant: INTEL IP CORPORATION, Santa Clara, CA (US)

(72) Inventors: Daniel Cohn, Raanana (IL); Solomon B. Trainin, Haifa (IL); Tal Davidson, Holon (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/666,608

(22) Filed: Mar. 24, 2015

(65) Prior Publication Data
US 2016/0286024 A1    Sep. 29, 2016

(51) Int. Cl.
| | |
|---|---|
| H04B 1/38 | (2015.01) |
| H04M 1/725 | (2006.01) |
| H04W 72/04 | (2009.01) |
| H04W 76/06 | (2009.01) |
| H04W 4/12 | (2009.01) |
| H04W 4/02 | (2009.01) |

(52) U.S. Cl.
CPC ......... *H04M 1/72527* (2013.01); *H04W 4/027* (2013.01); *H04W 4/12* (2013.01); *H04W 72/048* (2013.01); *H04W 76/06* (2013.01)

(58) Field of Classification Search
CPC .... H04M 1/72527; H04W 4/027; H04W 4/12; H04W 72/048; H04W 76/06
USPC ........... 455/73, 67.7, 513, 554.2, 556.1, 557
See application file for complete search history.

(56) References Cited

U.S. PATENT DOCUMENTS

| | | | |
|---|---|---|---|
| 6,163,692 A  * | 12/2000 | Chakrabarti | H04M 3/56 370/261 |
| 8,254,992 B1 * | 8/2012 | Ashenbrenner | G06F 1/1632 455/41.2 |
| 2003/0054758 A1 | 3/2003 | Kawamata et al. | |
| 2004/0082329 A1 | 4/2004 | Suzuki et al. | |

(Continued)

FOREIGN PATENT DOCUMENTS

| | | |
|---|---|---|
| WO | 2014085231 | 6/2014 |
| WO | 2014185706 | 11/2014 |

OTHER PUBLICATIONS

Office Action for U.S. Appl. No. 14/495,636, mailed on Dec. 17, 2015, 16 pages.

(Continued)

*Primary Examiner* — Tuan Pham
(74) *Attorney, Agent, or Firm* — Shichrur & Co.

(57) ABSTRACT

Some demonstrative embodiments include an apparatus, method and/or system of terminating a docking session between a mobile device and a docking device. For example, a mobile device may include a radio to communicate over a docking session via a wireless communication link between the mobile device and a wireless docking device; and an event classifier to determine a classification of an event of connectivity loss of the wireless communication link as an intentional disconnection or an unintentional disconnection, based on a comparison between at least one acceleration metric of the mobile device and at least one acceleration threshold, and to send to the wireless docking device an indication of the classification of the event of connectivity loss.

21 Claims, 8 Drawing Sheets

(56) References Cited

U.S. PATENT DOCUMENTS

| | | |
|---|---|---|
| 2005/0267965 A1 | 12/2005 | Heller |
| 2010/0274885 A1 | 10/2010 | Yoo et al. |
| 2011/0058500 A1 | 3/2011 | Nagasaki |
| 2011/0299422 A1 | 12/2011 | Kim et al. |
| 2012/0244879 A1 | 9/2012 | Freathy et al. |
| 2013/0124762 A1 | 5/2013 | Tamir et al. |
| 2013/0159552 A1 | 6/2013 | Xiang et al. |
| 2013/0210494 A1 | 8/2013 | Jouin |
| 2014/0330998 A1 | 11/2014 | Dees et al. |
| 2014/0358840 A1* | 12/2014 | Tadic .............. B60W 40/09 706/52 |
| 2015/0078140 A1 | 3/2015 | Riobo Aboy et al. |
| 2015/0230280 A1 | 8/2015 | Dees et al. |
| 2015/0304929 A1 | 10/2015 | Hua et al. |
| 2016/0088143 A1 | 3/2016 | Cohn et al. |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

Wi-Fi Alliance, Wi-Fi Peer-to-Peer (P2P) Technical Specification Version 1.5, Aug. 4, 2014, 183 pages.

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Wi-Fi Alliance, Wi-Fi Certified Miracast™: Extending the Wi-Fi experience to seamless video display, Sep. 19, 2012, 18 pages.

Office Action for U.S. Appl. No. 14/495,636, mailed on Jun. 30, 2016, 17 pages.

International Search Report and Written Opinion for PCT/US2016/019055, mailed on Jun. 29, 2016, 12 pages.

* cited by examiner

APPARATUS, SYSTEM AND METHOD OF TERMINATING A DOCKING SESSION BETWEEN A MOBILE DEVICE AND A DOCKING DEVICE

TECHNICAL FIELD

Embodiments described herein generally relate to apparatus, system and method of terminating a docking session between a mobile device and a docking device.

BACKGROUND

Mobile devices are becoming smaller and smaller, and typically have decreasingly smaller screens and less Input/Output (IO) ports from generation to generation.

Docking stations are commonly used nowadays to extend the IO port array of the mobile devices, and provide a convenient means for a mobile device to hook up to a static variety of peripheral devices ("peripherals"), such as displays, monitors, external storage devices, external Hard Disk Drives (HDD), a mouse, keyboards, webcams, communication devices, and the like.

A docking device (also referred to as "docking station") may typically be placed on a table, while being permanently connected to the peripherals, and a user of the mobile device may connect the mobile device to the docking station ("dock") to utilize the peripherals.

A wireless docking device is a docking device, in which the user may connect the mobile device to the wireless docking device in a wireless manner via a wireless communication link.

A connectivity loss of the wireless communication link may occur, for example, if the user of the mobile device moves the mobile device from the docking device or when the wireless communication link is obstructed.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
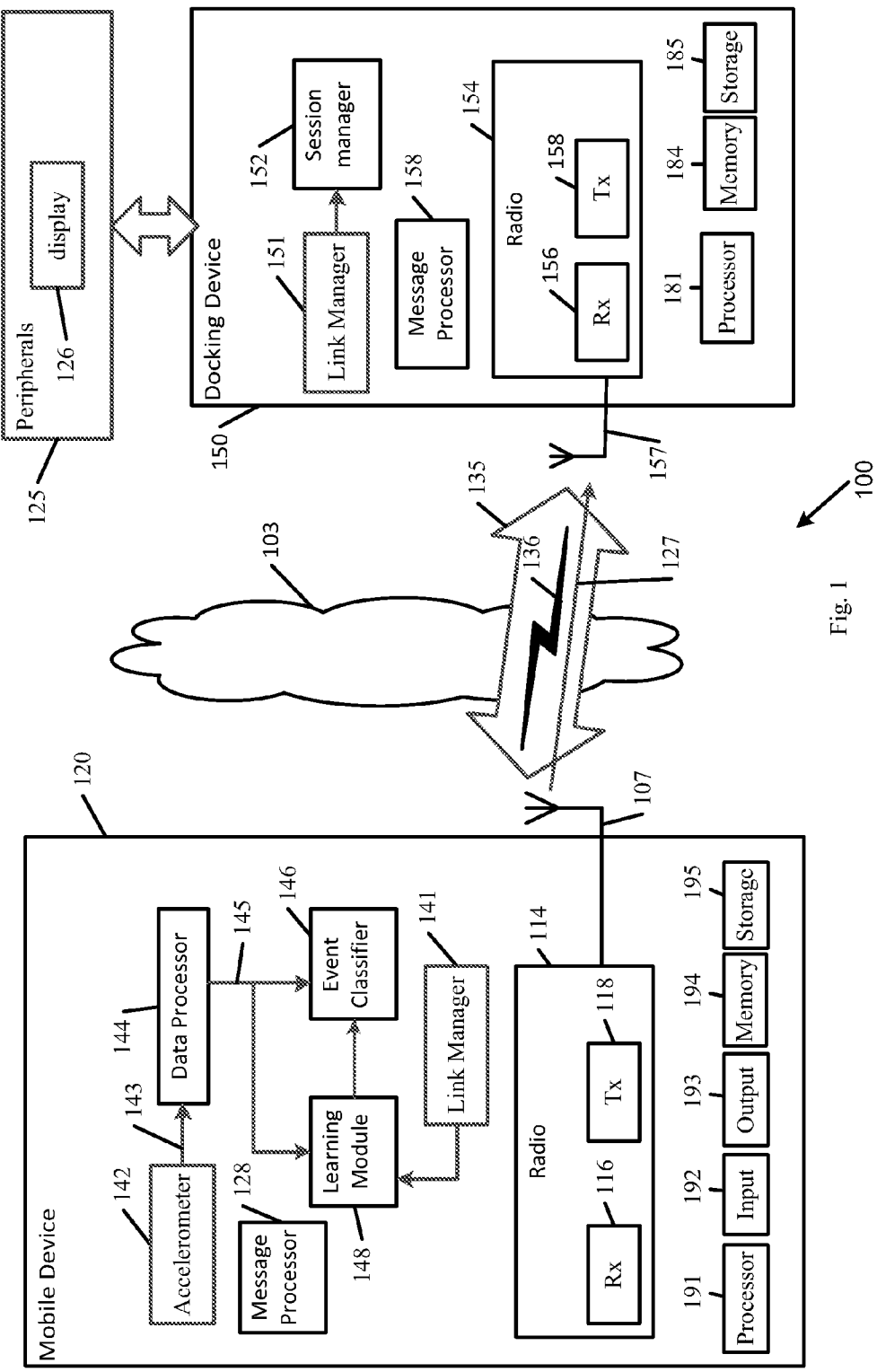
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a docking device, a docking station, a peripheral device, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version 1.1, April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE*802.11*ac*-2013 (*"IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz"*, Dec., 2013); *IEEE* 802.11*ad* (*"IEEE P*802.11*ad*-2012, *IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band"*, 28 Dec., 2012); IEEE-802.11REVmc (*"IEEE* 802.11-*REVmc*™/ *D*3.0, *June* 2014 *draft standard for Information technology—Telecommunications and information exchange between systems Local and metropolitan area networks Specific requirements; Part* 11: *Wireless LAN Medium Access Control (MAC) and Physical Layer (PHY) Specification"*)) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with a WLAN. Other embodiments may be used in conjunction with any other suitable wireless communication network, for example, a wireless area network, a "piconet", a WPAN, a WVAN and the like.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless medium (WM) 103. For example, system 100 may include a mobile device 120 (also referred to as "client device") and a wireless docking device 150 (also referred to as "docking station" or "Dock").

In some demonstrative embodiments, wireless medium 103 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, mobile device 120 and/or wireless docking device 150 may include one or more radios including circuitry and/or logic to perform wireless communication between mobile device 120, wireless docking device 150, and/or one or more other wireless communication devices. For example, wireless docking device 150 may include a radio 154, and/or mobile device 120 may include a radio 114.

In some demonstrative embodiments, radios 154 and/or 114 may include one or more wireless transmitters, receivers and/or transceivers able to send and/or receive wireless communication signals, RF signals, frames, blocks, transmission streams, packets, messages, data items, and/or data.

In some demonstrative embodiments, radio 114 and/or radio 154 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 154 may include a receiver 156.

In some demonstrative embodiments, radio 114 and/or radio 154 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 154 may include a transmitter 159.

In some demonstrative embodiments, radio 114 and/or radio 154 may include circuitry and/or logic, modulation elements, demodulation elements, amplifiers, analog to digital and digital to analog converters, filters, and/or the like. In one example, radios 114 and/or 154 may include or may be implemented as part of a wireless Network Interface Card (NIC), and the like.

In some demonstrative embodiments, radios 154 and/or 114 may include, or may be associated with, one or more antennas. For example, radio 154 may be associated with one or more antennas 157, and/or radio 114 may be associated with one or more antennas 107.

In one example, mobile device 120 may include a single antenna 107. In other example, mobile device 120 may include two or more antennas 107.

In one example, docking device 150 may include a single antenna 157. In other example, docking device 150 may include two or more antennas 157.

Antennas 157 and/or 107 may include any type of antennas suitable for transmitting and/or receiving wireless communication signals, blocks, frames, transmission streams, packets, messages and/or data. For example, antennas 157 and/or 107 may include any suitable configuration, structure and/or arrangement of one or more antenna elements, components, units, assemblies and/or arrays. Antennas 157 and/or 107 may include, for example, antennas suitable for directional communication, e.g., using beamforming techniques. For example, antennas 157 and/or 107 may include a phased array antenna, a multiple element antenna, a set of switched beam antennas, and/or the like. In some embodiments, antennas 157 and/or 107 may implement transmit and receive functionalities using separate transmit and receive antenna elements. In some embodiments, antennas 157 and/or 107 may implement transmit and receive functionalities using common and/or integrated transmit/receive elements.

In some demonstrative embodiments, mobile device 120 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), an "Origami" device or computing device, a video device, an audio device, an A/V device, a gaming device, a media player, a Smartphone, or the like.

In some demonstrative embodiments, mobile device 120 may include, for example, a processor 191, an input unit 192, an output unit 193, a memory unit 194, and/or a storage unit 195; and/or docking device 150 may include for example, a processor 181, a memory unit 184, and/or a storage unit 185. Mobile device 120 and/or docking device 150 may optionally include other suitable hardware components and/or software components. In some demonstrative embodiments, some or all of the components of mobile device 120 and/or docking device 150 may be enclosed in a common housing or packaging, and may be interconnected or operably associated using one or more wired or wireless links. In other embodiments, components of mobile device 120 and/or docking device 150 may be distributed among multiple or separate devices.

Processor 191 and/or 181 include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. For example, processor 191 executes instructions, for example, of an Operating System (OS) of mobile device 120 and/or of one or more suitable applications; and/or For example, processor 181 executes instructions, for example, of an Operating System (OS) of docking device 150 and/or of one or more suitable applications.

Memory unit 194 and/or 184 include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or 185 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 120; and/or memory unit 184 and/or storage unit 185, for example, may store data processed by docking device 150.

Input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, Cathode Ray Tube (CRT) display unit, one or more audio speakers or earphones, or other suitable output devices.

In some demonstrative embodiments, wireless docking device 150 may be connected to one or more peripherals 125.

In some demonstrative embodiments, wireless docking device 150 may be configured to provide one or more docking functionalities to a mobile device, e.g., mobile device 120, in a wireless manner. For example, wireless docking device 150 may enable the mobile device to utilize peripherals 125 and to use one or more functionalities associated with peripherals 125 in a wireless manner.

In some demonstrative embodiments, peripherals 125 may include a display 126.

In some demonstrative embodiments, peripherals 125 may also include a keyboard, a mouse, one or more loudspeakers, a Universal Serial Bus (USB) hub, an external storage, and/or any other peripheral device.

In some demonstrative embodiments, peripherals 125 may be implemented as part of docking device 150. For example, docking device 150 may be embedded as part of display 126.

In other embodiments, peripherals 125 may be implemented as a separate element, which is connected to docking device 150. For example, docking device 150 may include a wireless docking station connected to display 126.

In some demonstrative embodiments, radios 154 and 114 may be configured to establish a wireless communication link 135 between mobile device 120 and wireless docking device 150 over WM 103 to connect between mobile device 120 and wireless docking device 150.

In some demonstrative embodiments, wireless communication link 135 may include a millimeter-wave (mmwave) wireless communication link.

In some demonstrative embodiments, wireless communication link 135 may include a short-range wireless communication link at a multi-gigabit-per-second (MGbs) rate. For example, wireless communication link 135 may include a Wireless-Gigabit (WiGig) link.

In some demonstrative embodiments, wireless communication link 135 may include a peer-to-peer (P2P) communication link.

In some demonstrative embodiments, wireless communication link 135 may include a WiFi link.

In some demonstrative embodiments, wireless communication link 135 may include a Bluetooth link.

In other embodiments, wireless communication link 135 may include any other wireless communication link.

In some demonstrative embodiments, radios 154 and 114 may establish wireless communication link 135 to provide the one or more docking functionalities to mobile device 120.

In one example, wireless docking device 150 may enable a user of mobile device 120 to view video content from mobile device 120 on display 126. For example, mobile device 120 may include a Smartphone, and wireless docking device 150 may connect the Smartphone to display 126, for example, to enable the user of mobile device 120 to watch a video, which may be stored by the Smartphone, on display 126.

In another example, mobile device 120 may include a Smartphone, and wireless docking device 150 may connect the Smartphone to the keyboard and/or the mouse, for example, to enable the user of mobile device 120 to edit a file, which may be displayed on display 126, using the keyboard and/or the mouse.

In some demonstrative embodiments, radios 154 and 114 may communicate over a docking session 136 via wireless communication link 135.

In one example, radios 154 and 114 may communicate over docking session 136 to provide the one or more docking functionalities to mobile device 120.

In some demonstrative embodiments, docking device 150 may include a session manager 152 to manage docking session 136.

In some demonstrative embodiments, session manger 152 may include circuitry and/or logic, e.g., one or more processors including circuitry, memory circuitry, Media-Access Control (MAC) circuitry and/or logic, Physical Layer (PHY) circuitry and/or logic, and/or any other circuitry and/or logic, configured to perform the functionality of session manger 152, e.g., as described below. Additionally or alternatively, one or more functionalities of session manger 152 may be implemented by logic, which may be executed by a machine and/or one or more processors, e.g., as described below.

In some demonstrative embodiments, a connectivity loss event may include degradation in a quality of wireless communication link 135 below a predefined quality threshold.

In some demonstrative embodiments, mobile device 120 and/or docking device 150 may include a link manger to detect the degradation in a quality of wireless communication link 135, e.g., based on the predefined quality threshold. For example, mobile device 120 may include a link manager 141, and/or docking device 150 may include a link manager 151.

In some demonstrative embodiments, link manager 141 may be implemented as part of radio 114. In other embodiments, link manager 141 may be implemented as a separate element of device 120.

In some demonstrative embodiments, link manager 141 may be implemented as part of radio 154. In other embodiments, link manager 151 may be implemented as a separate element of device 150.

In some demonstrative embodiments, the connectivity loss event may include a link loss or a link degradation, in which one or more of the docking functionalities cannot be provided to mobile device 120, e.g., display services, mouse services, keyboards services and/or any other services provided by docking device 150 to mobile device 120.

In one example, the connectivity loss event may result from a nature of WM 103, e.g., when WM 103 is temporarily obstructed during normal operation between docking device 150 and mobile device 120, and as a result, the quality of wireless communication link 135 may be degraded.

According to this example, it may be advantageous to mitigate and/or to avoid an impact of the degradation of the quality of wireless communication link 135, for example, by freezing contents displayed on display 126, maintaining connections to one or more USB devices in peripherals 125; and/or attempting to restore wireless communication link 135, for example, by increasing a transmission power of docking device 150 and/or mobile device 120, and/or switching from a first wireless communication channel to a second, e.g., different, wireless communication channel to communicate between mobile device 120 and docking device 150.

In another example, the connectivity loss event may result from an action of the user of mobile device 120, e.g., when the user takes mobile device 120 and leaves docking device 150, for example, after the user completes using docking device 150.

According to this example, it may be advantageous to terminate docking session 136 as soon as the user leaves docking device 150, for example, to avoid exposure of contents from mobile device 120 on display 126, e.g., after the user leaves docking device 150, and/or to make docking device 150 available to another user.

In some demonstrative embodiments, the connectivity loss event may be classified as a disconnection event or as a non-disconnection event.

In one example, an actual classification of the link loss event may be determined only after a time period from the connectivity loss event.

For example, the actual classification of the link loss event can be determined only after the user walks away a couple of meters from docking device 150.

In some demonstrative embodiments, a disconnection event (also referred to as "an intentional connectivity loss event") corresponding to a previous connectivity loss event may include wireless communication link 135 remaining disconnected after a predefined disconnection period from the previous connectivity loss event.

In one example, a disconnection event may occur, for example, when the user of mobile device 120 moves mobile device 120 away from docking device 150.

In some demonstrative embodiments, a non-disconnection event (also referred to as "an unintentional connectivity loss event") corresponding to a previous connectivity loss event may include restoration of wireless communication link 135 within the predefined disconnection period.

In one example, the non-disconnection event may occur, for example, when the user of mobile device 120 continues to use docking device 150, e.g., after an interruption of wireless communication link 135 during normal operation between mobile device 120 and docking device 150, for example, as a result from obstruction of wireless communication link 135, a slight movement of mobile device 120, and/or the like.

In some demonstrative embodiments, session manager 152 may be configured to terminate docking session 136.

In some demonstrative embodiments, terminating docking session 136 based on a duration of the connectivity loss event may affect a privacy of the user and/or a user experience of the user.

In one example, session manager 152 may terminate docking session 136 if a duration of the connectivity loss event is greater than the predefined disconnection period ("a long loss event").

In another example, session manager 152 may attempt to restore wireless communication link 135 if the duration of the connectivity loss event is less than the predefined disconnection period ("a short loss event").

In some demonstrative embodiments, terminating docking session 136 if the duration of the connectivity loss event is greater than the predefined time period ("link-restore time period") may reduce the privacy of the user and/or the availability of docking device 150, for example, if the connectivity loss event is actually a disconnection event.

For example, docking session 136 may remain active and/or docking device 120 may remain unavailable for another user, e.g., until the duration of the connectivity loss event exceeds the link-restore time period, for example, even if the user of mobile device 120 leaves docking device 150 immediately.

In some demonstrative embodiments, determining a short predefined disconnection period, e.g., to avoid compromising the privacy of the user and/or the availability of docking device 150, may compromise the user experience of the user of mobile device 120, for example, if the connectivity loss event is actually a non-disconnection event.

For example, session manager 152 may terminate docking session 136, in response to a degradation in the quality of wireless communication link 135, e.g., even if the user of mobile device 120 does not leave docking device 150 and continues to use docking device 150.

Some demonstrative embodiments may enable to identify the connectivity loss event as a disconnection event, e.g., the intentional connectivity loss event, or as non-disconnection event, e.g., the unintentional connectivity loss event.

Some demonstrative embodiments may enable session manager 152 to terminate docking session 136, for example, without waiting until the link-restore time period ends.

Some demonstrative embodiments may enable session manager 152 to immediately terminate docking session 136, for example, when the user of device 120 leaves docking device 150.

Some demonstrative embodiments may enable session manager 152 to identify the connectivity loss event, for example, independent of the duration of the connectivity loss event.

Some demonstrative embodiments may enable to classify the event of connectivity loss of wireless communication link 135, for example, based on movement patterns of mobile device 120, which may typically be present before an intentional connectivity loss event, e.g., as described below.

Some demonstrative embodiments may enable to classify the event of connectivity loss of wireless communication link 135, for example, based on an acceleration of mobile device 120, and/or the movement patterns of mobile device 120, e.g., as described below.

In some demonstrative embodiments, mobile device 120 may include an event classifier 146 to classify the event of connectivity loss of wireless communication link 135 as an intentional disconnection or an unintentional disconnection, e.g., as described below.

In some demonstrative embodiments, event classifier 146 may include circuitry and/or logic, e.g., one or more processors including circuitry, memory circuitry, Media-Access Control (MAC) circuitry and/or logic, Physical Layer (PHY) circuitry and/or logic, and/or any other circuitry and/or logic, configured to perform the functionality of event classifier 146, e.g., as described below. Additionally or alternatively, one or more functionalities of event classifier 146 may be implemented by logic, which may be executed by a machine and/or one or more processors, e.g., as described below.

In some demonstrative embodiments, device 120 may include a message processor 128 configured to generate, process and/or access one or messages communicated by device 120.

In one example, message processor 128 may be configured to generate one or more messages to be transmitted by device 120, and/or message processor 128 may be configured to access and/or to process one or more messages received by device 102, e.g., as described below.

In some demonstrative embodiments, docking device 150 may include a message processor 158 configured to generate, process and/or access one or messages communicated by device 150.

In one example, message processor 158 may be configured to generate one or more messages to be transmitted by docking device 150, and/or message processor 158 may be configured to access and/or to process one or more messages received by docking device 150, e.g., as described below.

In some demonstrative embodiments, message processors 128 and/or 158 may include circuitry and/or logic, e.g., one or more processors including circuitry, memory circuitry, Media-Access Control (MAC) circuitry and/or logic, Physical Layer (PHY) circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 154.

In some demonstrative embodiments, at least part of the functionality of message processor 128 may be implemented as part of event classifier 146.

In other embodiments, the functionality of message processor 128 may be implemented as part of any other element of device 120.

In some demonstrative embodiments, at least part of the functionality of message processor 158 may be implemented as part of session manager 152.

In other embodiments, the functionality of message processor 128 may be implemented as part of any other element of docking device 150.

In some demonstrative embodiments, event classifier 146 may classify the event of connectivity loss based on the acceleration of mobile device 120 and/or the movement pattern of mobile device 120.

In some demonstrative embodiments, mobile device 120 may include an accelerometer 142 to provide a plurality of acceleration values 143 of an acceleration of mobile device 120.

In some demonstrative embodiments, the plurality of acceleration values 143 may include acceleration values of mobile device 120 in one or more dimensions.

In one example, the plurality of acceleration values 143 may include acceleration values of mobile device 120 in a two-dimensional plane or a three-dimensional space.

In some demonstrative embodiments, mobile device 120 may include a data processor 144 configured to process the plurality of acceleration values 143.

In some demonstrative embodiments, data processor 144 may receive the plurality of acceleration values 143 from accelerometer 142.

In some demonstrative embodiments, data processor 144 may determine at least one acceleration metric 145, for example, based on the plurality of acceleration values 143.

In some demonstrative embodiments, acceleration metric 145 may include more than one acceleration metric.

In one example, acceleration metric 145 may include one or more of the following acceleration metrics:

TABLE 1

| Metric ID | Metric |
|---|---|
| 1 | Peak absolute acceleration (module of {x,y,z} vector components) |
| 2 | Peak absolute acceleration (module of {x,y} vector components) |
| 3 | Average absolute acceleration (module of {x,y,z} vector components) |
| 4 | Average absolute acceleration (module of {x,y} vector components) |
| 5 | Peak acceleration (module of {x,y,z} vector components) relative to long-term average |
| 6 | Peak acceleration (module of {x,y} vector components) relative to long-term average |
| 7 | Average acceleration (module of {x,y,z} vector components) relative to long-term average |
| 8 | Average acceleration (module of {x,y} vector components) relative to long-term average |
| 9 | Acceleration variance (module of {x,y,z} vector components) |
| 10 | Acceleration variance (module of {x,y} vector components) |

In some demonstrative embodiments, acceleration metric 145 may include at least one vector of acceleration parameters of mobile device 120.

In some demonstrative embodiments, the at least one vector may include acceleration parameters in a two-dimensional plane or a three-dimensional space.

In some demonstrative embodiments, acceleration metric 145 may include a magnitude (also referred to as "module" or "modulus") value of a vector of the acceleration parameters.

In some demonstrative embodiments, acceleration metric 145 may include at least one vector of the acceleration parameters of mobile device 120 within at least one moving time window.

In some demonstrative embodiments, the moving time window may include a plurality of moving time windows.

In some demonstrative embodiments, each acceleration metric of Table 1 may have a metric identifier (ID). For example, the Acceleration variance (modulus of {x,y,z} vector components) of Table 1 may have metric ID 9.

In some demonstrative embodiments, each moving time window of the plurality of moving time windows may have a different time interval.

In one example, acceleration metric 145 may include a peak absolute acceleration, e.g., metric ID 1, within 3 different time windows, e.g., within the last 1 second (sec), 2 sec, and 3 sec.

In some demonstrative embodiments, data processor 144 may continuously store acceleration metric 145.

In one example, data processor 144 may store values of acceleration metric 145 in a circular buffer, for example, to enable data processor 144 to provide the last stored values of acceleration metric 145 within the at least one moving time window.

In one example, data processor 144 may store the circular buffer in memory 194. In another example, data processor 144 may store the circular buffer in any other storage and/or memory.

In some demonstrative embodiments, data processor 144 may provide acceleration metric 145 to event classifier 146.

In some demonstrative embodiments, event classifier 146 may receive acceleration metric 145 from data processor 146, and may classify the event of connectivity loss based on acceleration metric 145.

In some demonstrative embodiments, event classifier 146 may classify the event of connectivity loss based on more than one acceleration metric, e.g., two or more acceleration metrics of Table 1.

In some demonstrative embodiments, event classifier 146 may classify the event of connectivity loss based on an acceleration metric 145 within more than one moving time window.

In some demonstrative embodiments, event classifier 146 may classify the event of connectivity loss based on a comparison between acceleration metric 145 and at least one acceleration threshold.

In some demonstrative embodiments, event classifier 146 may classify the event of connectivity loss as an intentional disconnection, for example, if acceleration metric 145 is greater than the acceleration threshold.

In some demonstrative embodiments, event classifier 146 may classify the event of connectivity loss as an as an unintentional disconnection, for example, if acceleration metric 145 is less than the acceleration threshold.

In some demonstrative embodiments, event classifier 146 may send to wireless docking device 150 a message including an indication 127 of the classification of the event of connectivity loss.

In one example, message processor 128 may generate indication 127, and radio 114 may transmit a message including indication 127 to docking device 150.

In some demonstrative embodiments, wireless docking device 150 may receive from mobile device 120 the indication 127 of the classification of the event of connectivity loss as an intentional disconnection or an unintentional disconnection.

In some demonstrative embodiments, session manager 152 may terminate docking session 136 based on the indication 127.

In some demonstrative embodiments, session manager 152 may terminate docking session 136, for example, if indication 127 indicates that the event of connectivity loss is classified as an intentional disconnection.

In one example, session manager 152 may immediately terminate docking session 136, for example, to protect the privacy of the user of mobile device 120 and/or to make docking device 150 available to other users.

In some demonstrative embodiments, session manager 152 may attempt to restore wireless communication link 135 within a predefined restore period, for example, if indication 127 includes that the event of connectivity loss is classified as an unintentional disconnection.

In some demonstrative embodiments, session manager 152 may attempt to restore wireless communication link 135, for example, by increasing a transmission power of radio 154, switching to another wireless communication channel to communicate with mobile device 120, and/or the like.

In some demonstrative embodiments, if the event of connectivity loss is classified as an unintentional disconnection, session manager 152 may attempt to mitigate an impact of the connectivity loss event, for example, by freezing content displayed on display 126, and/or maintaining connections of one or more USB devices to docking device 150, for example, until wireless communication link 135 is restored, or until the duration of the connectivity loss event exceeds the predefined restore period.

In some demonstrative embodiments, mobile device 120 may include a learning module 148 configured to update the at least one acceleration threshold.

In some demonstrative embodiments, learning module 148 may be configured to learn the acceleration patterns of mobile device 120, which are typically present before the intentional connectivity loss event.

In some demonstrative embodiments, learning module 148 may be configured to learn different acceleration patterns for different users of mobile device 120 and/or different working environments of mobile device 120, e.g., different docking devices and/or stations.

In one example, different users of mobile device 120 and/or different working environments of mobile device 120 may correspond to different acceleration patterns of mobile device 120 before the intentional connectivity loss event.

In some demonstrative embodiments, operations of learning module 148 may be triggered every time a connectivity loss event occurs.

In one example, link manager 141 may indicate to the learning module 148 every time the connectivity loss event occurs.

In some demonstrative embodiments, learning module 148 may update the acceleration threshold based on a correlation between classifications of a plurality of previous events of connectivity loss according to the acceleration threshold, and actual classifications of the plurality of previous events of connectivity loss.

In one example, event classifier 146 may classify a first number of connectivity loss events as an intentional disconnection according to the acceleration threshold. However, a second, e.g., different, number of connectivity loss events may actually be classified as an intentional connectivity loss events. According to this example, learning module 148 may update the acceleration threshold based on a correlation between the classification of the first number of connectivity loss events according to the acceleration threshold and the actual classifications of the connectivity loss events.

In some demonstrative embodiments, learning module 148 may update the acceleration threshold based on a plurality of previous values of acceleration metric 145 corresponding to a respective plurality of previous events of connectivity loss of the wireless communication link.

In some demonstrative embodiments, the plurality of previous values may include a first plurality of values corresponding to disconnection events, and a second plurality of values corresponding to non-disconnection events.

In some demonstrative embodiments, a disconnection event corresponding to a previous connectivity loss event may include wireless communication link 135 remaining disconnected after the predefined disconnection period from the previous connectivity loss event, e.g., as described above.

In some demonstrative embodiments, a non-disconnection event corresponding to the previous connectivity loss event may include restoration of wireless communication link 135 within the predefined disconnection period.

In some demonstrative embodiments, learning module 148 may determine a false positive event ratio. A false positive event may be defined when a previous connectivity loss event is actually classified as an unintentional connectivity loss event, while acceleration metric 145 is higher than the acceleration threshold. The false positive event ratio may include a number of false positive events divided by a total number of previous connectivity loss events.

In some demonstrative embodiments, learning module 148 may determine a false negative event ratio. A false negative event may be defined when a previous connectivity loss event is actually classified as an intentional connectivity loss event, while acceleration metric 145 is lower than the acceleration threshold. The false negative event ratio may include a number of false negative events divided by the total number of previous connectivity loss events.

In some demonstrative embodiments, learning module 148 may calculate a number of connectivity loss events actually classified as an unintentional connectivity loss event.

In some demonstrative embodiments, learning module 148 may calculate a number of connectivity loss events actually classified as an intentional connectivity loss event.

In some demonstrative embodiments, learning module 148 may update the acceleration threshold, for example, based on one or more connectivity loss conditions, e.g., if the false positive event ratio is less than a predefined false positive ratio, denoted $\alpha_{FP}$; if the false negative event ratio is less than a predefined false negative ratio, denoted $\alpha_{FN}$; if the number of the connectivity loss events actually classified as unintentional connectivity loss events is higher than a predefined number of unintentional connectivity loss events, denoted $N_{UT}$; and/or if the number of connectivity loss events actually classified as intentional connectivity loss events is higher than a predefined number of intentional connectivity loss event, denoted $N_I$.

In some demonstrative embodiments, learning module 148 may determine the predefined false positive ratio $\alpha_{FP}$, the predefined false negative ratio $\alpha_{FN}$, the number $N_{UT}$, and/or the number $N_I$, such that a false negative probability, denoted $P_{FN}$, of detecting an intentional connectivity loss event may be lower than a predefined margin, and/or a false positive probability, denoted $P_{FP}$, of detecting an intentional connectivity loss event may be lower than the predefined margin.

In some demonstrative embodiments, the predefined margin may be determined, for example, to assure that a duration of a learning process of learning module 148 may not be excessively long.

In some demonstrative embodiments, a confidence level of acceleration metric 145 may be defined, e.g., as follows:

$$\text{Confidence Level} = 1 - (\alpha_{FP} - \alpha_{FN})/2 \quad (1)$$

In some demonstrative embodiments, learning module 148 may continue to update the acceleration threshold, for example, based on the confidence level.

In one example, learning module 148 may update the acceleration threshold, for example, if the Confidence Level of an updated acceleration threshold is higher than the Confidence Level of the acceleration threshold.

In some demonstrative embodiments, learning module 148 may select acceleration metric 145 from a plurality of acceleration metrics.

In one example, learning module 148 may select a single acceleration metric from the acceleration metrics of Table 1.

In another example, learning module 148 may select more than one acceleration metric from the acceleration metrics of Table 1.

In another example, learning module 148 may select acceleration metric 145 from any other additional and/or alternative metric.

In some demonstrative embodiments, learning module 148 may select acceleration metric 145 from the plurality of acceleration metrics, for example, based on a comparison between the confidence level of acceleration metric 145 and a confidence level of another acceleration metric.

In some demonstrative embodiments, learning module 148 may be configured to store learning parameters corresponding to the learning process of learning module 148.

In some demonstrative embodiments, learning module 148 may store the learning parameters in memory 194.

In one example, learning module 148 may store the plurality of previous values in memory 194, the first plurality of values corresponding to the disconnection events, the second plurality of values corresponding to the non-disconnection events, the predefined false positive ratio $\alpha_{FP}$, the predefined false negative ratio $\alpha_{FN}$, the number $N_{UT}$, the number $N_I$, and/or any other parameters corresponding to the learning process of learning module 148.

In some demonstrative embodiments, learning module 148 may associate the learning parameters to a specific user, a specific working environment, and/or a specific docking device.

In some demonstrative embodiments, learning module 148 may not update the acceleration threshold, for example, if the connectivity loss conditions are not met.

In some demonstrative embodiments, learning module 148 may declare "no pattern found", for example, if the connectivity loss conditions are not met.

In some demonstrative embodiments, event classifier 146 may not be able to classify the connectivity loss event as an unintentional disconnection or as an intentional disconnection, for example, if learning module 148 declares "no pattern found".

In some demonstrative embodiments, indication 127 may include the classification of the connectivity loss event as an unknown type of disconnection, for example, if learning module 148 declares "no pattern found".

In some demonstrative embodiments, session manager 152 may receive indication 127 including the unknown type of disconnection. According to these embodiments, session manager 152 may terminate docking session 136, for example, based on the duration of the connectivity loss event, e.g., as described above.

In some demonstrative embodiments, the classification of the connectivity loss event may be implemented by one or more elements of mobile device 120, for example, event classifier 146 and/or learning module 148, e.g., as described above.

In other embodiments, the classification of the connectivity loss event may be implemented by docking device 150.

In some demonstrative embodiments, device 150 may include one or more elements configured to classify the connectivity loss event.

In one example, device 150 may include learning module 148 and/or event classifier 146, e.g., as described below with reference to FIG. 2.

Figure 2:
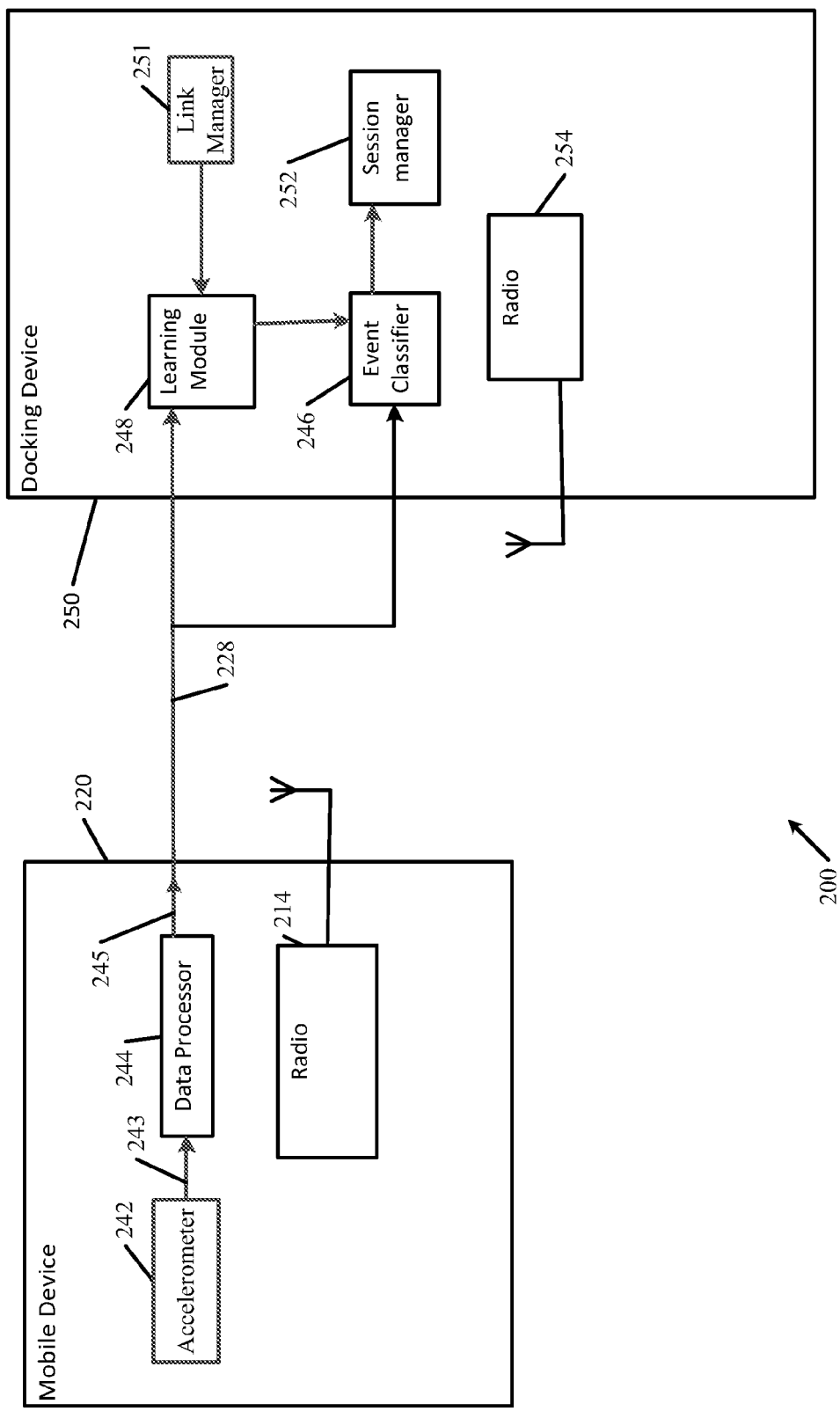
FIG. 2 is a schematic block diagram illustration of another system, in accordance with some demonstrative embodiments.

Reference is made to FIG. 2, which schematically illustrates a system 200, in accordance with some demonstrative embodiments.

As shown in FIG. 2, system 200 may include a mobile device 220 and a wireless docking device 250.

As shown in FIG. 2, mobile device 220 may include an accelerometer 242 to provide a plurality of acceleration values 243 of an acceleration of mobile device 220. For example, accelerometer 242 may perform the functionality of accelerometer 142 (FIG. 1).

As shown in FIG. 2, mobile device 220 may include a data processor 244 to calculate at least one acceleration metric 245 of mobile device 220, based on the plurality of acceleration values 243. For example, data processor 244 may perform the functionality of data processor 144 (FIG. 1).

As shown in FIG. 2, mobile device 220 and/or docking device 250 may include a radio to communicate between mobile device 220 and wirelesses docking device 250 over a docking session via a wireless communication link.

In some demonstrative embodiments, mobile device 220 may include a radio 214 and/or docking device 250 may include a radio 254. For example, radio 214 may perform the functionality of radio 114 (FIG. 1), and/or radio 254 may perform the functionality of radio 154 (FIG. 1).

In some demonstrative embodiments, radio 214 may transmit a message 228 to wireless docking device 250 via the wireless communication link.

In some demonstrative embodiments, message 228 may include acceleration metric 245.

In some demonstrative embodiments, acceleration metric 245 may include at least one vector of acceleration parameters of mobile device 220 within at least one moving time window, e.g., as described above.

In some demonstrative embodiments, the at least one vector may include acceleration parameters in a two-dimensional plane or a three-dimensional space, e.g., as described above.

In some demonstrative embodiments, radio 214 may send message 228 to wireless docking device 250, e.g., periodically.

In some demonstrative embodiments, radio 214 may send message 228 to wireless docking device 250, for example, when a quality of the wireless communication link is below a predefined quality threshold.

In some demonstrative embodiments, docking device 250 may receive from mobile device 220 message 228 including acceleration metric 245.

As shown in FIG. 2, docking device 250 may include an event classifier 246 to determine a classification of an event of connectivity loss of the wireless communication link as an intentional disconnection or an unintentional disconnection. For example, event classifier 246 may perform the functionality of event classifier 146 (FIG. 1).

In some demonstrative embodiments, event classifier 246 may receive message 228 including acceleration metric 245.

In some demonstrative embodiments, event classifier 246 may determine the classification of the event of connectivity loss of the wireless communication link as an intentional disconnection or an unintentional disconnection, based on a comparison between acceleration metric 245 and at least one acceleration threshold, e.g., as described above.

As shown in FIG. 2, docking device 250 may include a session manager 252 to manage the docking session. For example, session manager 252 may perform the functionality of session manager 152 (FIG. 1).

In some demonstrative embodiments, session manager 252 may terminate the docking session based on the classification of the event of connectivity loss.

In some demonstrative embodiments, session manager 252 may terminate the docking session, if the event of connectivity loss is classified as an intentional disconnection, e.g., as described above.

In some demonstrative embodiments, session manager 252 may attempt to restore the wireless communication link within a predefined restore period, if the event of connectivity loss is classified as an unintentional disconnection, e.g., as described above.

In some demonstrative embodiments, event classifier 246 may classify the event of connectivity loss as an intentional disconnection, if acceleration metric 245 is greater than the acceleration threshold.

In some demonstrative embodiments, event classifier 246 may classify the event of connectivity loss as an unintentional disconnection, if acceleration metric 245 is less than the acceleration threshold.

As shown in FIG. 2, docking device 250 may include a learning module 248 to update the at least one acceleration threshold. For example, learning module 248 may perform the functionality of learning module 148 (FIG. 1).

In some demonstrative embodiments, learning module 248 may update the acceleration threshold based on a correlation between classifications of a plurality of previous events of connectivity loss according to the at least one acceleration threshold, and actual classifications of the plurality of previous events of connectivity loss, e.g., as described above.

In some demonstrative embodiments, learning module 248 may update the acceleration threshold based on a plurality of previous values of the at least one acceleration metric corresponding to a respective plurality of previous events of connectivity loss of the wireless communication links, e.g., as described above.

In some demonstrative embodiments, the plurality of previous values may include a first plurality of values corresponding to disconnection events, and a second plurality of values corresponding to non-disconnection events, a disconnection event corresponding to a previous connectivity loss event may include the wireless communication link remaining disconnected after a predefined disconnection period from the previous connectivity loss event, and a non-disconnection event corresponding to the previous connectivity loss event may include restoration of the wireless communication link within the predefined disconnection period, e.g., as described above.

In some demonstrative embodiments, learning module 248 may select the at least one acceleration metric from a plurality of acceleration metrics. For example, learning module 248 may select acceleration metric 245 from the one or more acceleration metrics of Table 1, e.g., as described above.

In some demonstrative embodiments, the event of connectivity loss may include degradation in a quality of the wireless communication link below a predefined quality threshold.

As shown in FIG. 2, docking device 250 may include a link manager 251 to indicate, for example, when the quality of the wireless communication link is below a predefined quality threshold. For example, link manager 251 may perform the functionality of link manager 151 (FIG. 1)

Figure 3:
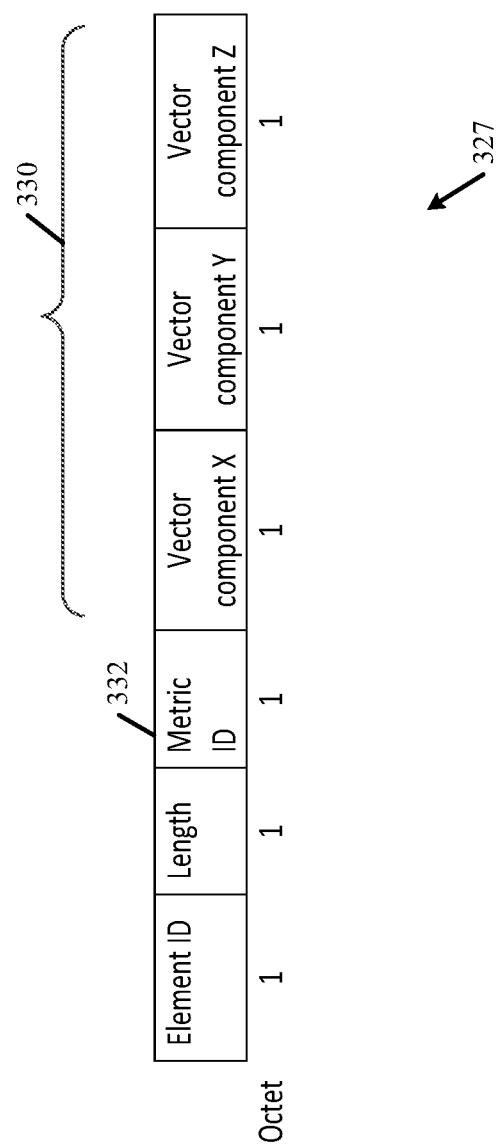
FIG. 3 is a schematic illustration of a structure of an in formation element (IE), in accordance with some demonstrative embodiments.

Reference is made to FIG. 3, which schematically illustrates a structure of an information element (IE) 327, in accordance with some demonstrative embodiments. For example, IE 327 may be part of message 228 (FIG. 2).

In some demonstrative embodiments, mobile device 220 (FIG. 2) may transmit message 228 (FIG. 2) including IE 327 to docking device 250.

In some demonstrative embodiments, the IE may include an extension of information elements of message 228 (FIG. 2).

In some demonstrative embodiments, IE 327 may include values of acceleration metric 245 (FIG. 2).

As shown in FIG. 3, IE 327 may include a vector field 330 to include the values of acceleration metric 245 (FIG. 2).

As shown in FIG. 3, vector field 330 may enable including up to three different values, e.g., acceleration parameters in up to a three-dimensional space.

In some demonstrative embodiments, vector field 330 may include a vector of acceleration parameters of a mobile device within a moving time window. For example, vector field 330 may include values in a three-dimensional space of an average absolute acceleration, e.g., Metric ID 3 in Table 1, of mobile device 220 (FIG. 2) within the last 2 sec.

As shown in FIG. 3, IE 327 may include an acceleration metric identification (ID) field 332 to identify the type of acceleration metric 245 (FIG. 2). For example, the acceleration metric ID field may include the value "5" of Table 1, e.g., if acceleration metric 245 (FIG. 2) includes the "Peak acceleration relative to long-term average" of mobile device 220 (FIG. 2).

In some demonstrative embodiments, message 228 (FIG. 2) may be communicated as part of management messages of a communication protocol between mobile device 220 (FIG. 2) and docking device 250 (FIG. 2).

In other embodiments, message 228 (FIG. 2) may be communicated as part of any other messages of any other communication protocol between mobile device 220 (FIG. 2) and docking device 250 (FIG. 2).

Figure 4:
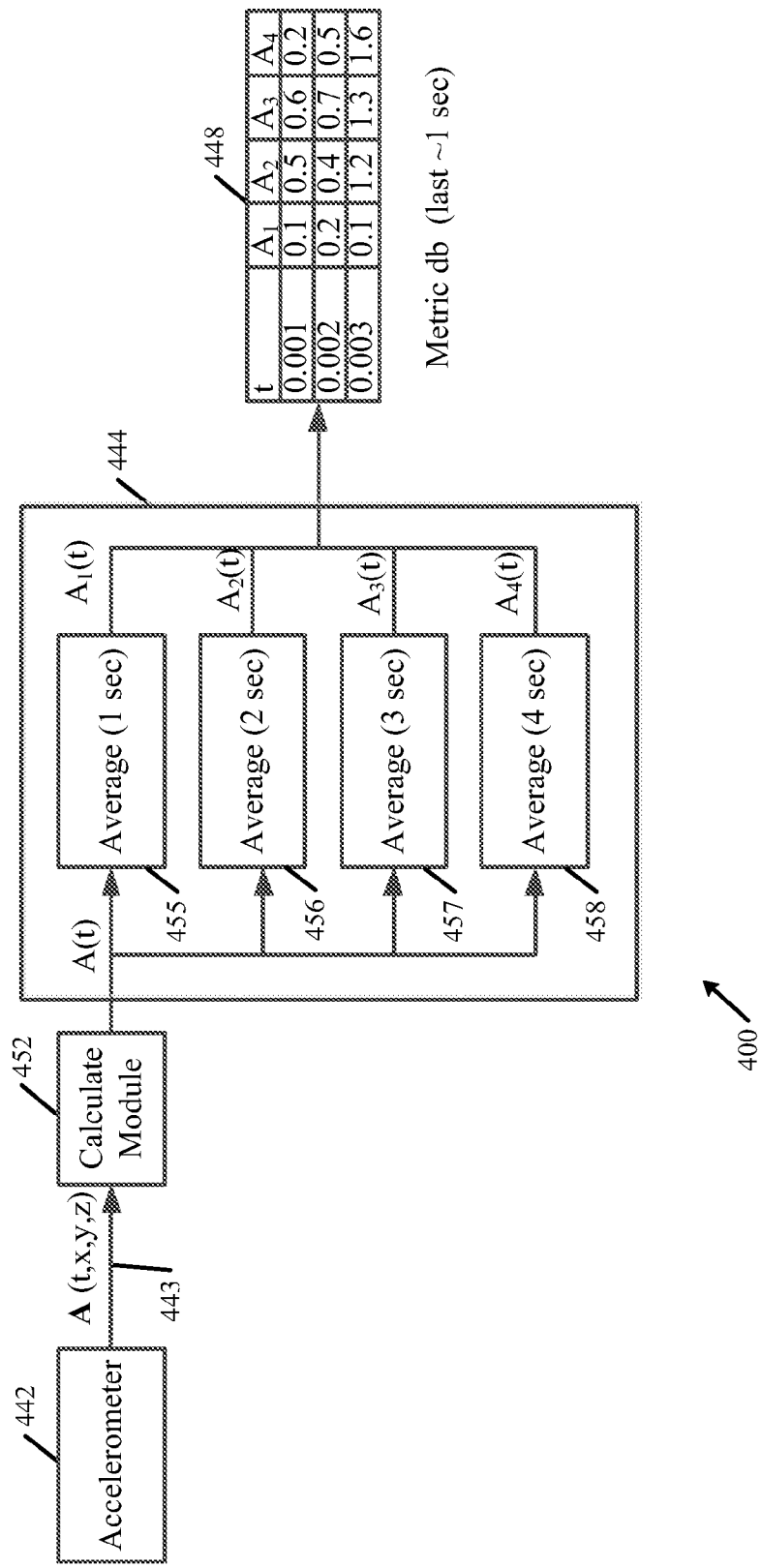
FIG. 4 is a schematic illustration of a data processing scheme, in accordance with some demonstrative embodiments.

Reference is made to FIG. 4, which schematically illustrates a data processing scheme 400, in accordance with some demonstrative embodiments.

As shown in FIG. 4, data processing scheme 400 may include an accelerometer 442 to continuously provide a plurality of acceleration values 443. For example, accelerometer 442 may perform the functionality of accelerometer 142 (FIG. 1) and/or accelerometer 242 (FIG. 2).

As shown in FIG. 4, data processing scheme 400 may include a data processing block 444 to process the plurality of acceleration values 443.

In some demonstrative embodiments, data processing block 444 may be configured to calculate at least one acceleration metric within at least one moving time window. For example, data processor block 444 may perform the functionality data processor 144 (FIG. 1) and/or data processor 244 (FIG. 2).

As shown in FIG. 4, data processor block 444 may include a module calculator 452 to calculate, for example, a modulus of a vector of the plurality of acceleration values 443.

In some demonstrative embodiments, the at least one acceleration metric may include an average absolute acceleration, which may be represented as a modulus of a vector of a plurality of acceleration values 443. In other embodiments, the at least one acceleration metric may include any other acceleration metric.

In some demonstrative embodiments, data processing block 444 may be configured to calculate the acceleration metric within more than one moving time window.

In one example, data processing block 444 may be configured to calculate the acceleration metric within three moving time windows.

In other example, data processor block 444 may calculate the acceleration metric within any other number of moving time windows, e.g., 2, 4, or 5 moving time windows.

As shown in FIG. 4, data processor block 444 may calculate the average absolute acceleration, for example, over four different moving time windows, e.g., 1 sec, 2 sec, 3 sec and 4 sec.

In other embodiments, data processor block 444 may calculate the average absolute acceleration over other four different moving time windows, e.g., 2 sec, 4 sec, 6 sec, and 8 sec.

As shown in FIG. 4, data processor block 444 may include four average calculators, a first average calculator 455 to calculate the average absolute acceleration within the last 1 sec, a second average calculator 456 to calculate the average absolute acceleration within the last 2 sec, a third average calculator 457 to calculate average absolute acceleration within the last 3 sec, and/or a fourth average calculator 458 to calculate the average absolute acceleration within the last 4 seconds.

As shown in FIG. 4, data processor block 444 may store calculated values of the four average calculators in a database 448.

As shown in FIG. 4, database 448 may include a circular buffer to continuously store the calculated values of the four average calculators.

In some demonstrative embodiments, database 448 may be configured to store the calculated values within a predefined time period, for example, a short period of time, e.g., of one second.

In some demonstrative embodiments, learning modules 148 (FIG. 1) and/or 248 (FIG. 2) may be configured to retrieve the calculated values of the four average calculators, for example, every time a connectivity loss event is detected.

In some demonstrative embodiments, learning modules 148 (FIG. 1) and/or 248 (FIG. 2) may be configured to save the retrieved calculated values in a first database corresponding to disconnection events or in a second database corresponding to non-disconnection events.

Figure 5:
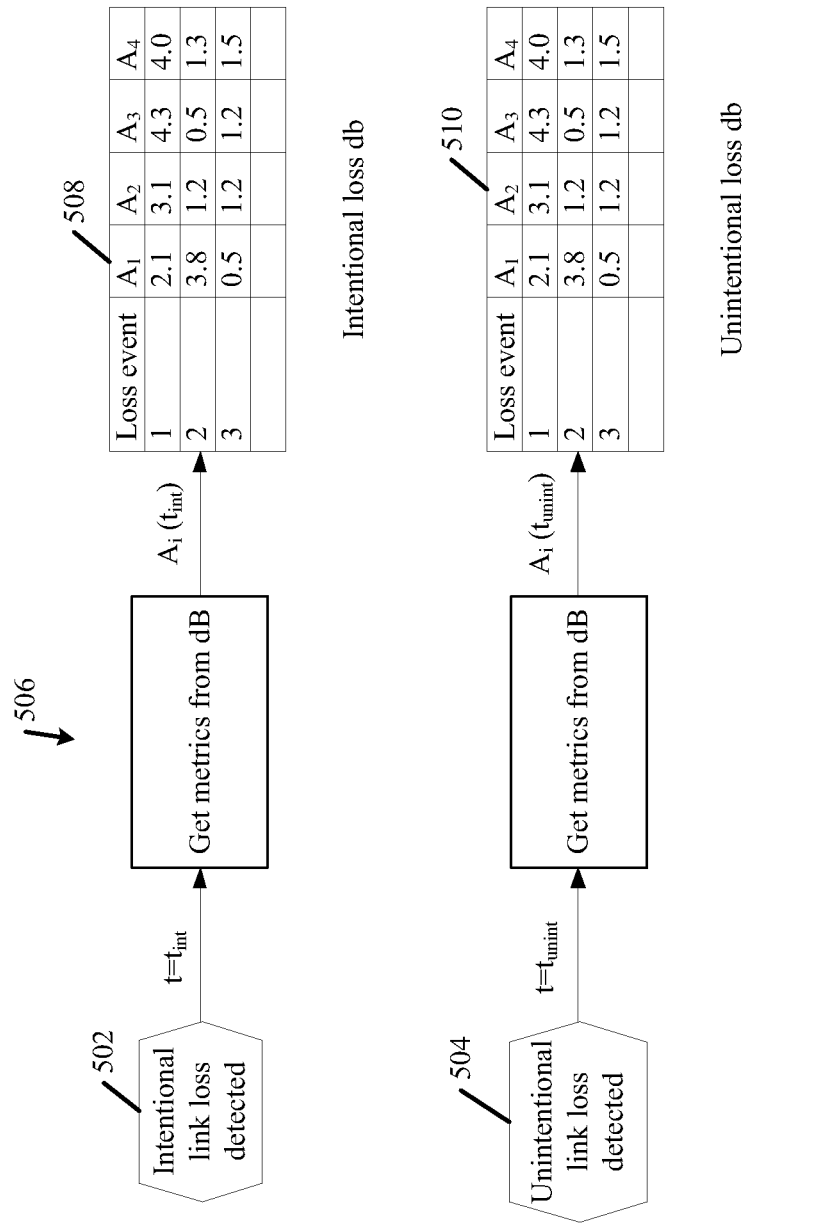
FIG. 5 is a schematic illustration of a storage scheme of storing values of at least one acceleration metric of a mobile device, in accordance with some demonstrative embodiments.

Reference is made to FIG. 5, which schematically illustrates a scheme 500 of saving previous values of at least one acceleration metric of a mobile device, in accordance with some demonstrative embodiments.

In some demonstrative embodiments, one or more of the functionalities of FIG. 5 may be performed by a learning module, e.g., learning module 148 (FIG. 1) and/or learning module 248 (FIG. 2).

In some demonstrative embodiments, scheme 500 may be utilized to save previous values of at least one acceleration metric of mobile device 120 (FIG. 1) and/or mobile device 220 (FIG. 2), e.g., as described below.

In some demonstrative embodiments, scheme 500 may be utilized to save previous values of at least one acceleration metric within four different moving time windows, e.g., as described below.

In one example, scheme 500 may be utilized to save the previous calculated values of the acceleration metric of FIG. 4.

As shown in FIG. 5, the learning module may determine whether a connectivity loss event is a disconnection event (502) or a non-disconnection event (504).

In one example, the learning module may determine that the connectivity loss event is a disconnection event, e.g., if wireless communication link 135 (FIG. 1) remains disconnected after the predefined restore period from the connectivity loss event, e.g., as described above.

In another example, the learning module may determine that the connectivity loss event is a non-disconnection event, e.g., if the wireless communication link 135 (FIG. 1) is restored within the predefined restore period from the connectivity loss event, e.g., as described above.

As shown in FIG. 5, the learning module may retrieve (506) from database 448 (FIG. 4) calculated values of the acceleration metric corresponding to the connectivity loss event. For example, the learning module may retrieve from database 448 (FIG. 4) calculated values corresponding to the time the connectivity loss event occurred.

As shown in FIG. 5, the learning module may retrieve (506) from database 448 (FIG. 4) the calculated values of the acceleration metric within the four different moving time windows.

As shown in FIG. 5, the learning module may store the calculated values of the acceleration metric in an intentional loss database 508, e.g., if the connectivity loss event is a disconnection event.

As shown in FIG. 5, the learning module may store the calculated values of the acceleration in an unintentional loss database 510, e.g., if the connectivity loss event is a non-disconnection event.

In some demonstrative embodiments, the learning module may update the acceleration threshold and/or may reselect the acceleration metric, e.g., every time a connectivity loss event occurs, for example, based on a correlation between values of the acceleration metric and stored values in databases 508 and 510.

For example, the learning module may update the acceleration threshold and/or may select the acceleration metric, for example, by iterating over one or more moving time windows in databases 508 and/or 510 to detect a pattern and/or to improve the acceleration threshold and/or the acceleration metric.

Figure 6:
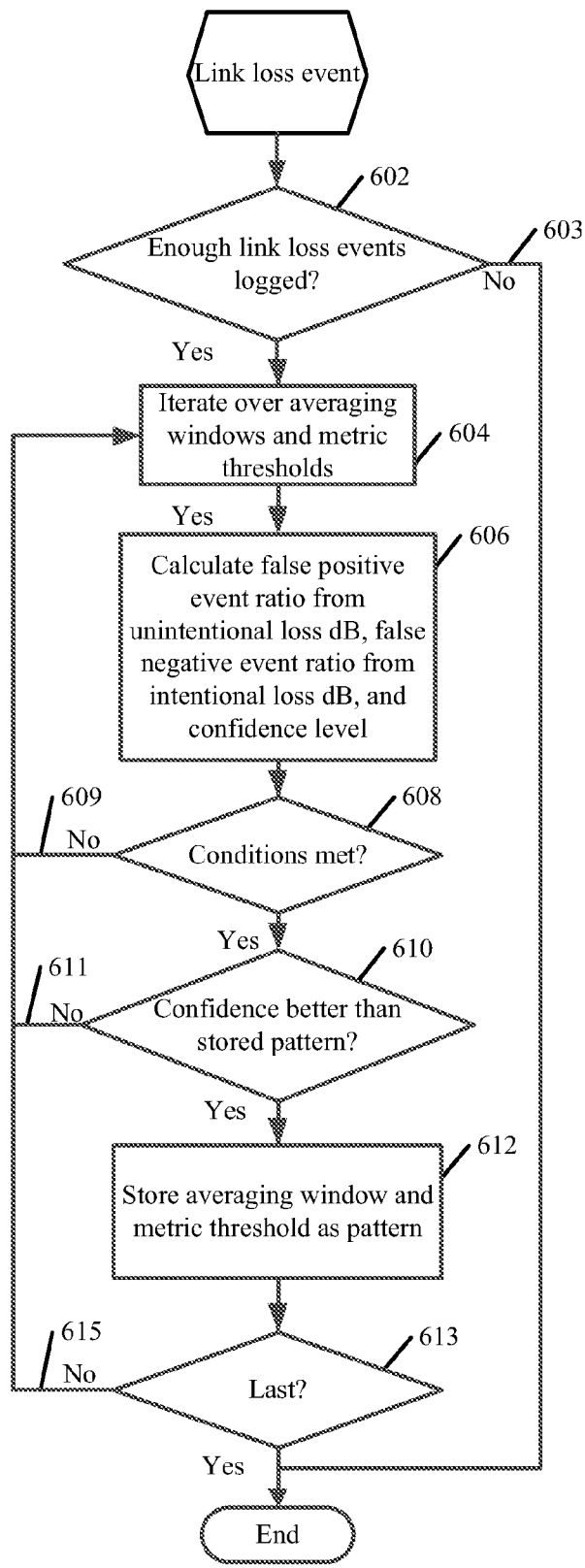
FIG. 6 is a schematic flow-chart illustration of a method of updating an acceleration threshold, in accordance with some demonstrative embodiments.

Reference is made to FIG. 6, which schematically illustrates a method of updating an acceleration threshold, in accordance with some demonstrative embodiments. For example, one or more of the operations of FIG. 6 may be performed by a wireless communication system, e.g., systems 100 (FIG. 1) and/or 200 (FIG. 2); a wireless docking device, e.g., wireless docking device 250 (FIG. 2); a mobile device, e.g., mobile device 120 (FIG. 1); and/or a learning module, e.g., learning modules 148 (FIG. 1), 248 (FIG. 2) and/or 448 (FIG. 4).

As indicated at block 602, the method may include determining whether or not a number of previous connectivity loss events is greater than a predefined number. For example, learning module 148 (FIG. 1) and/or learning module 248 (FIG. 2) may determine whether or not the total number of previous connectivity loss events is greater than a predefined number.

As indicated by arrow 603, the method may include terminating the method, for example, if the number of previous connectivity loss events is less than the predefined number. For example, learning module 148 (FIG. 1) and/or learning module 248 (FIG. 2) may terminate the learning process, for example, if the number of previous connectivity loss events is less than the predefined number.

As indicated at block 604, the method may include iterating over previous values of an acceleration metric to determine an updated acceleration metric and/or an updated acceleration threshold, e.g., if the total number of previous connectivity loss events is greater than the predefined number. For example, learning module 148 (FIG. 1) and/or learning module 248 (FIG. 2) may iterate over databases 508 and 510 (FIG. 5), e.g., as described above.

As indicated at block 606, the method may include determining a false negative event ratio, a false negative event ratio, and a confidence level. For example, learning module 148 (FIG. 1) and/or learning module 248 (FIG. 2) may determine the false negative event ratio, the false negative event ratio, and the Confidence Level, e.g., as described above.

As indicated at block 608, the method may include determining whether or not one or more connectivity loss conditions are met. For example, learning module 148 (FIG. 1) and/or learning module 248 (FIG. 2) may determine whether or not the connectivity loss conditions are met, e.g., as described above.

As indicated by arrow 609, the method may include reiterating over the previous values of the acceleration metric to determine a different updated acceleration threshold and/or acceleration metric, e.g., if the connectivity loss conditions are not met. For example, learning module 148 (FIG. 1) and/or learning module 248 (FIG. 2) may reiterate over databases 508 and 510 (FIG. 5) to determine a different acceleration threshold and/or acceleration metric.

As indicated at block 610, the method may include determining whether or not the confidence level according to the updated acceleration threshold and/or the updated acceleration metric is greater than the confidence level of the acceleration threshold and/or the acceleration metric. For example, learning module 148 (FIG. 1) and/or learning module 248 (FIG. 2) may determine whether or not the updated acceleration threshold and/or the updated acceleration metric is greater than the confidence level of the acceleration threshold and/or acceleration metric 145 (FIG. 1), e.g., as described above.

As indicated by arrow 611, the method may include reiterating over the previous values of the acceleration metric to determine a different acceleration threshold and/or acceleration metric, e.g., if the confidence level according to the updated acceleration threshold and/or the updated acceleration metric is not greater than the confidence level of the acceleration threshold and/or the acceleration metric. For example, learning module 148 (FIG. 1) and/or learning module 248 (FIG. 2) may reiterate over databases 508 and 510 (FIG. 5) to determine a different acceleration threshold and/or acceleration metric.

As indicated at block 612, the method may include storing the selected acceleration threshold and/or the selected acceleration metric. For example, learning module 148 (FIG. 1) may store acceleration metric 145 (FIG. 1) and the acceleration threshold in storage 195 (FIG. 1), and/or learning module 248 (FIG. 2) may store acceleration metric 245 (FIG. 2) and the acceleration threshold in storage 185 (FIG. 1), e.g., as described above.

As indicated at block 613, the method may include determining whether or not all of the previous values of the acceleration metric have been considered. For example, learning module 148 (FIG. 1) and/or learning module 248 (FIG. 2) may determine whether or not all of the previous values in databases 508 and 510 (FIG. 5) have been considered.

As indicated by arrow 615, the method may include reiterating over the previous values of the acceleration metric to determine a different updated acceleration threshold and/or acceleration metric, e.g., if all of the previous values of the acceleration metric have been considered. For example, learning module 148 (FIG. 1) and/or learning module 248 (FIG. 2) may reiterate over databases 508 and 510 (FIG. 5) to determine a different acceleration threshold and/or acceleration metric.

Figure 7:
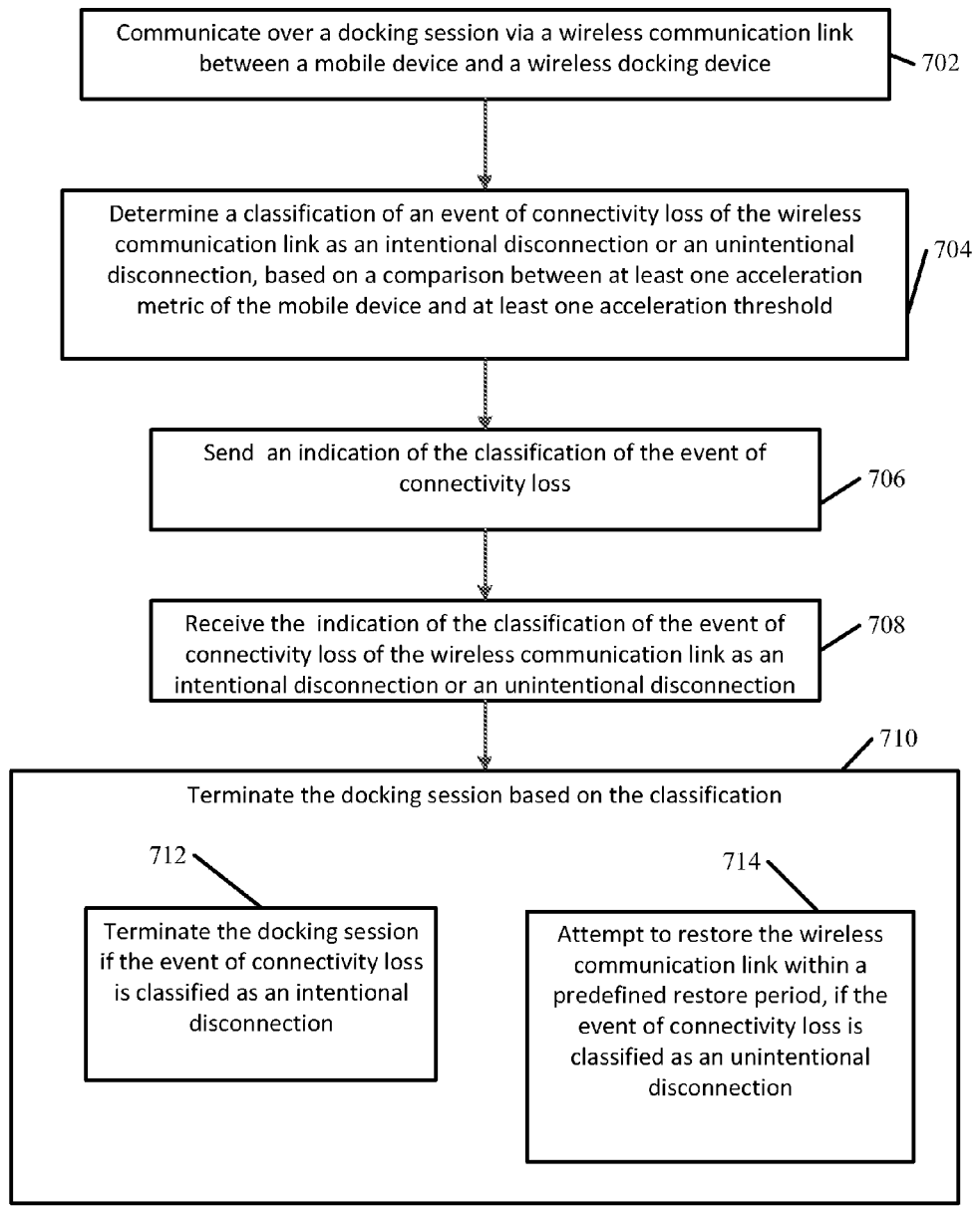
FIG. 7 is a schematic flow-chart illustration of a method of terminating a docking session between a mobile device and a docking device, in accordance with some demonstrative embodiments.

Reference is made to FIG. 7, which schematically illustrated a method of terminating a docking session between a mobile device and a docking device, in accordance with some demonstrative embodiments. For example, one or more of the operations of the method of FIG. 7 may be performed by a wireless communication system, e.g., systems 100 (FIG. 1) and/or 200 (FIG. 2); a wireless docking device, e.g., wireless docking devices 150 (FIG. 1) and/or 250 (FIG. 2); a mobile device, e.g., mobile device 120 (FIG. 1) and/or mobile device 220 (FIG. 2), and/or a radio, e.g., radios 114 and/or 154 (FIG. 1).

As indicated at block 702, the method may include communicating over a docking session via a wireless communication link between a mobile device and a wireless docking device. For example, radios 114 and 154 (FIG. 1) may communicate over docking session 136 (FIG. 1) via wireless communication ink 135 (FIG. 1), e.g., as described above.

As indicated at block 704, the method may include determining a classification of an event of connectivity loss of the wireless communication link as an intentional disconnection or an unintentional disconnection, based on a comparison between at least one acceleration metric of the mobile device and at least one acceleration threshold. In one example, event classifier 146 (FIG. 1) may determine a classification of an event of connectivity loss of wireless communication link 135 (FIG. 1) as an intentional disconnection or an unintentional disconnection, based on a comparison between acceleration metric 145 (FIG. 1) of mobile device 120 (FIG. 1) and the at least one acceleration threshold. In another example, event classifier 246 (FIG. 2) may determine a classification of an event of connectivity loss of the wireless communication link as an intentional disconnection or an unintentional disconnection, based on a comparison between acceleration metric 245 (FIG. 2) of mobile device 220 (FIG. 2) and the at least one acceleration threshold, e.g., as described above.

As indicated at block 706, the method may include receiving an indication of a classification of an event of connectivity loss of the wireless communication link as an intentional disconnection or an unintentional disconnection. In one example, session manager 152 (FIG. 1) may receive from mobile device 120 (FIG. 1) the indication 127 (FIG. 1) including the classification of the event of connectivity loss of wireless communication link 135 (FIG. 1). In another example, session manager 252 (FIG. 2) may receive from event classifier 246 (FIG. 2) the indication of the classification of the event of connectivity loss of the wireless communication link as an intentional disconnection or an unintentional disconnection, e.g., as described above.

As indicated at block 708, the method may include terminating the docking session based on the classification. In one example, session manager 152 (FIG. 1) may terminate docking session 136 (FIG. 1) based on the classification. In another example, session manager 252 (FIG. 2) may terminate the docking session based on the classification, e.g., as described above.

As indicated at block 710, terminating the docking session may include terminating the docking session if the event of connectivity loss is classified as an intentional disconnection. In one example, session manager 152 (FIG. 1) may terminate docking session 136 (FIG. 1) if the event of connectivity loss is classified as an intentional disconnection. In another example, session manager 252 (FIG. 2) may terminate the docking session if the event of connectivity loss is classified as an intentional disconnection, e.g., as described above.

As indicated at block 712, terminating the docking session may include attempting to restore the wireless communication link within a predefined restore period, if the event of connectivity loss is classified as an unintentional disconnection. In one example, session manager 152 (FIG. 1) may attempt to restore wireless communication link 135 (FIG. 1) within the predefined restore period, for example, if the event of connectivity loss is classified as an unintentional disconnection. In another example, session manager 252 (FIG. 2) may attempt to restore the wireless communication link within the predefined restore period, if the event of connectivity loss is classified as an unintentional disconnection, e.g., as described above.

Figure 8:
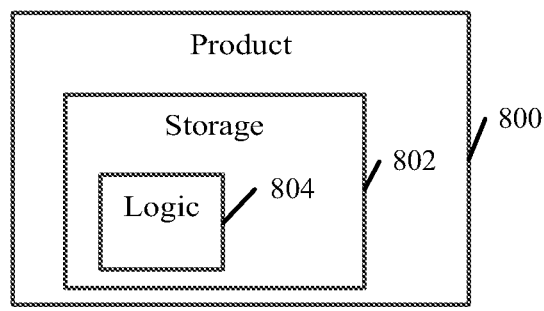
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include a non-transitory machine-readable storage medium 802 to store logic 804, which may be used, for example, to perform at least part of the functionality of docking device 150 (FIG. 1), mobile device 120 (FIG. 1), docking device 250 (FIG. 2), mobile device 220 (FIG. 2), event classifier 146 (FIG. 1), event classifier 246 (FIG. 2), learning module 148 (FIG. 1), learning module 248 (FIG. 2), and/or to perform one or more operations of the methods of FIGS. 6 and/or 7. The phrase "non-transitory machine-readable medium" is directed to include all computer-readable media, with the sole exception being a transitory propagating signal.

In some demonstrative embodiments, product 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a mobile device comprising a radio to communicate over a docking session via a wireless communication link between the mobile device and a wireless docking device; and an event classifier to determine a classification of an event of connectivity loss of the wireless communication link as an intentional disconnection or an unintentional disconnection, based on a comparison between at least one acceleration metric of the mobile device and at least one acceleration threshold, and to send to the wireless docking device an indication of the classification of the event of connectivity loss.

Example 2 includes the subject matter of Example 1, and optionally, wherein the event classifier is to classify the event of connectivity loss as an intentional disconnection, if the acceleration metric is greater than the acceleration threshold, and to classify the event of connectivity loss as an unintentional disconnection, if the acceleration metric is less than the acceleration threshold.

Example 3 includes the subject matter of Example 1 or 2, and optionally, comprising a learning module to update the at least one acceleration threshold.

Example 4 includes the subject matter of Example 3, and optionally, wherein the learning module is to update the acceleration threshold based on a correlation between classifications of a plurality of previous events of connectivity loss according to the at least one acceleration threshold, and actual classifications of the plurality of previous events of connectivity loss.

Example 5 includes the subject matter of Example 3, and optionally, wherein the learning module is to update the acceleration threshold based on a plurality of previous values of the at least one acceleration metric corresponding to a respective plurality of previous events of connectivity loss of the wireless communication link.

Example 6 includes the subject matter of Example 5, and optionally, wherein the plurality of previous values comprises a first plurality of values corresponding to disconnection events, and a second plurality of values corresponding to non-disconnection events, a disconnection event corresponding to a previous connectivity loss event including the wireless communication link remaining disconnected after a predefined disconnection period from the previous connectivity loss event, and a non-disconnection event corresponding to the previous connectivity loss event including restoration of the wireless communication link within the predefined disconnection period.

Example 7 includes the subject matter of any one of Examples 3-6, and optionally, wherein the learning module is to select the at least one acceleration metric from a plurality of acceleration metrics.

Example 8 includes the subject matter of any one of Examples 1-7, and optionally, wherein the at least one acceleration metric comprises at least one vector of acceleration parameters of the mobile device within a moving time window, the at least one vector comprises acceleration parameters in a two-dimensional plane or a three-dimensional space.

Example 9 includes the subject matter of any one of Examples 1-8, and optionally, wherein the event of connectivity loss comprises degradation in a quality of the wireless communication link below a predefined quality threshold.

Example 10 includes the subject matter of any one of Examples 1-9, and optionally, comprising a data processor to process a plurality of acceleration values of an acceleration of the mobile device, and to calculate the at least one acceleration metric based on the plurality of acceleration values.

Example 11 includes the subject matter of Example 10, and optionally, comprising an accelerometer to provide the plurality of acceleration values.

Example 12 includes the subject matter of any one of Examples 1-11, and optionally, comprising one or more antennas; a memory; and a processor.

Example 13 includes a wireless docking device comprising a radio to communicate over a docking session via a wireless communication link between the wireless docking device and a mobile device; and a session manager to manage the docking session, the session manager to receive from the mobile device an indication of a classification of an event of connectivity loss of the wireless communication link as an intentional disconnection or an unintentional disconnection, and to terminate the docking session based on the classification.

Example 14 includes the subject matter of Example 13, and optionally, wherein the session manager is to terminate the docking session if the event of connectivity loss is classified as an intentional disconnection.

Example 15 includes the subject matter of Example 13 or 14, and optionally, wherein the session manager is to attempt to restore the wireless communication link within a predefined restore period, if the event of connectivity loss is classified as an unintentional disconnection.

Example 16 includes the subject matter of any one of Examples 13-15, and optionally, comprising one or more antennas; a memory; and a processor.

Example 17 includes a wireless docking device comprising a radio to communicate over a docking session via a wireless communication link between the wireless docking device and a mobile device; an event classifier to determine a classification of an event of connectivity loss of the wireless communication link as an intentional disconnection or an unintentional disconnection, based on a comparison between at least one acceleration metric of the mobile device and at least one acceleration threshold; and a session manager to terminate the docking session based on the classification.

Example 18 includes the subject matter of Example 17, and optionally, wherein the session manager is to terminate the docking session, if the event of connectivity loss is classified as an intentional disconnection.

Example 19 includes the subject matter of Example 17 or 18, and optionally, wherein the session manager is to attempt to restore the wireless communication link within a predefined restore period, if the event of connectivity loss is classified as an unintentional disconnection.

Example 20 includes the subject matter of any one of Examples 17-19, and optionally, wherein the event classifier is to classify the event of connectivity loss as an intentional disconnection, if the acceleration metric is greater than the acceleration threshold, and to classify the event of connectivity loss as an unintentional disconnection, if the acceleration metric is less than the acceleration threshold.

Example 21 includes the subject matter of any one of Examples 17-20, and optionally, wherein the event classifier is to receive from the mobile device a message including the acceleration metric.

Example 22 includes the subject matter of any one of Examples 17-21, and optionally, comprising a learning module to update the at least one acceleration threshold.

Example 23 includes the subject matter of Example 22, and optionally, wherein the learning module is to update the acceleration threshold based on a correlation between classifications of a plurality of previous events of connectivity loss according to the at least one acceleration threshold, and actual classifications of the plurality of previous events of connectivity loss.

Example 24 includes the subject matter of Example 22, and optionally, wherein the learning module is to update the acceleration threshold based on a plurality of previous values of the at least one acceleration metric corresponding to a respective plurality of previous events of connectivity loss of the wireless communication links.

Example 25 includes the subject matter of Example 24, and optionally, wherein the plurality of previous values comprises a first plurality of values corresponding to disconnection events, and a second plurality of values corresponding to non-disconnection events, a disconnection event corresponding to a previous connectivity loss event including the wireless communication link remaining disconnected after a predefined disconnection period from the previous connectivity loss event, and a non-disconnection event corresponding to the previous connectivity loss event including restoration of the wireless communication link within the predefined disconnection period.

Example 26 includes the subject matter of any one of Examples 22-25, and optionally, wherein the learning module is to select the at least one acceleration metric from a plurality of acceleration metrics.

Example 27 includes the subject matter of any one of Examples 17-26, and optionally, wherein the at least one acceleration metric comprises at least one vector of acceleration parameters of the mobile device within a moving time window, the at least one vector comprises acceleration parameters in a two-dimensional plane or a three-dimensional space.

Example 28 includes the subject matter of any one of Examples 17-27, and optionally, wherein the event of connectivity loss comprises degradation in a quality of the wireless communication link below a predefined quality threshold.

Example 29 includes the subject matter of any one of Examples 17-28, and optionally, comprising one or more antennas; a memory; and a processor.

Example 30 includes a mobile device comprising an accelerometer to provide a plurality of acceleration values of an acceleration of the mobile device; a data processor to calculate at least one acceleration metric of the mobile device, based on the plurality of acceleration parameters; and a radio to communicate between the mobile device and a wireless docking device over a docking session via a wireless communication link, and to transmit a message to the wireless docking device via the wireless communication link, the message including the at least one acceleration metric.

Example 31 includes the subject matter of Example 30, and optionally, wherein the at least one acceleration metric comprises at least one vector of acceleration parameters of the mobile device within a moving time window, the at least one vector comprises acceleration parameters in a two-dimensional plane or a three-dimensional space.

Example 32 includes the subject matter of Example 30 or 31, and optionally, wherein the radio is to send the message to the wireless docking device periodically.

Example 33 includes the subject matter of Example 30 or 31, and optionally, wherein the radio is to send the message to the wireless docking device when a quality of the wireless communication link is below a predefined quality threshold.

Example 34 includes the subject matter of any one of Examples 30-33, and optionally, comprising one or more antennas; a memory; and a processor.

Example 35 includes a wireless communication system comprising a mobile device, the mobile device comprising one or more antennas; a memory; a processor; a radio to communicate over a docking session via a wireless communication link between the mobile device and a wireless docking device; and an event classifier to determine a classification of an event of connectivity loss of the wireless communication link as an intentional disconnection or an unintentional disconnection, based on a comparison between at least one acceleration metric of the mobile device and at least one acceleration threshold, and to send to the wireless docking device an indication of the classification of the event of connectivity loss.

Example 36 includes the subject matter of Example 35, and optionally, wherein the event classifier is to classify the event of connectivity loss as an intentional disconnection, if the acceleration metric is greater than the acceleration threshold, and to classify the event of connectivity loss as an unintentional disconnection, if the acceleration metric is less than the acceleration threshold.

Example 37 includes the subject matter of Example 35 or 36, and optionally, comprising a learning module to update the at least one acceleration threshold.

Example 38 includes the subject matter of Example 37, and optionally, wherein the learning module is to update the acceleration threshold based on a correlation between classifications of a plurality of previous events of connectivity loss according to the at least one acceleration threshold, and actual classifications of the plurality of previous events of connectivity loss.

Example 39 includes the subject matter of Example 37, and optionally, wherein the learning module is to update the acceleration threshold based on a plurality of previous values of the at least one acceleration metric corresponding to a respective plurality of previous events of connectivity loss of the wireless communication link.

Example 40 includes the subject matter of Example 39, and optionally, wherein the plurality of previous values comprises a first plurality of values corresponding to disconnection events, and a second plurality of values corresponding to non-disconnection events, a disconnection event corresponding to a previous connectivity loss event including the wireless communication link remaining disconnected after a predefined disconnection period from the previous connectivity loss event, and a non-disconnection event corresponding to the previous connectivity loss event including restoration of the wireless communication link within the predefined disconnection period.

Example 41 includes the subject matter of any one of Examples 37-40, and optionally, wherein the learning module is to select the at least one acceleration metric from a plurality of acceleration metrics.

Example 42 includes the subject matter of any one of Examples 35-41, and optionally, wherein the at least one acceleration metric comprises at least one vector of acceleration parameters of the mobile device within a moving time window, the at least one vector comprises acceleration parameters in a two-dimensional plane or a three-dimensional space.

Example 43 includes the subject matter of any one of Examples 35-42, and optionally, wherein the event of connectivity loss comprises degradation in a quality of the wireless communication link below a predefined quality threshold.

Example 44 includes the subject matter of any one of Examples 35-43, and optionally, comprising a data processor to process a plurality of acceleration values of an acceleration of the mobile device, and to calculate the at least one acceleration metric based on the plurality of acceleration values.

Example 45 includes the subject matter of Example 44, and optionally, comprising an accelerometer to provide the plurality of acceleration values.

Example 46 includes a wireless communication system comprising a wireless docking device, the wireless docking device comprising one or more antennas; a memory; a processor; a radio to communicate over a docking session via a wireless communication link between the wireless docking device and a mobile device; and a session manager to manage the docking session, the session manager to receive from the mobile device an indication of a classification of an event of connectivity loss of the wireless communication link as an intentional disconnection or an unintentional disconnection, and to terminate the docking session based on the classification.

Example 47 includes the subject matter of Example 46, and optionally, wherein the session manager is to terminate the docking session if the event of connectivity loss is classified as an intentional disconnection.

Example 48 includes the subject matter of Example 46 or 47, and optionally, wherein the session manager is to attempt to restore the wireless communication link within a predefined restore period, if the event of connectivity loss is classified as an unintentional disconnection.

Example 49 includes a wireless communication system comprising a wireless docking device, the wireless docking device comprising one or more antennas; a memory; a processor; a radio to communicate over a docking session via a wireless communication link between the wireless docking device and a mobile device; an event classifier to determine a classification of an event of connectivity loss of the wireless communication link as an intentional disconnection or an unintentional disconnection, based on a comparison between at least one acceleration metric of the mobile device and at least one acceleration threshold; and a session manager to terminate the docking session based on the classification.

Example 50 includes the subject matter of Example 49, and optionally, wherein the session manager is to terminate the docking session, if the event of connectivity loss is classified as an intentional disconnection.

Example 51 includes the subject matter of Example 49 or 50, and optionally, wherein the session manager is to attempt to restore the wireless communication link within a predefined restore period, if the event of connectivity loss is classified as an unintentional disconnection.

Example 52 includes the subject matter of any one of Examples 49-51, and optionally, wherein the event classifier is to classify the event of connectivity loss as an intentional disconnection, if the acceleration metric is greater than the acceleration threshold, and to classify the event of connectivity loss as an unintentional disconnection, if the acceleration metric is less than the acceleration threshold.

Example 53 includes the subject matter of any one of Examples 49-52, and optionally, wherein the event classifier is to receive from the mobile device a message including the acceleration metric.

Example 54 includes the subject matter of any one of Examples 49-53, and optionally, comprising a learning module to update the at least one acceleration threshold.

Example 55 includes the subject matter of Example 54, and optionally, wherein the learning module is to update the acceleration threshold based on a correlation between classifications of a plurality of previous events of connectivity loss according to the at least one acceleration threshold, and actual classifications of the plurality of previous events of connectivity loss.

Example 56 includes the subject matter of Example 54, and optionally, wherein the learning module is to update the acceleration threshold based on a plurality of previous values of the at least one acceleration metric corresponding to a respective plurality of previous events of connectivity loss of the wireless communication links.

Example 57 includes the subject matter of Example 56, and optionally, wherein the plurality of previous values comprises a first plurality of values corresponding to disconnection events, and a second plurality of values corresponding to non-disconnection events, a disconnection event corresponding to a previous connectivity loss event including the wireless communication link remaining disconnected after a predefined disconnection period from the previous connectivity loss event, and a non-disconnection event corresponding to the previous connectivity loss event including restoration of the wireless communication link within the predefined disconnection period.

Example 58 includes the subject matter of any one of Examples 54-57, and optionally, wherein the learning module is to select the at least one acceleration metric from a plurality of acceleration metrics.

Example 59 includes the subject matter of any one of Examples 52-58, and optionally, wherein the at least one acceleration metric comprises at least one vector of acceleration parameters of the mobile device within a moving time window, the at least one vector comprises acceleration parameters in a two-dimensional plane or a three-dimensional space.

Example 60 includes the subject matter of any one of Examples 52-59, and optionally, wherein the event of connectivity loss comprises degradation in a quality of the wireless communication link below a predefined quality threshold.

Example 61 includes a wireless communication system comprising a mobile device, the mobile device comprising one or more antennas; a memory; a processor; an accelerometer to provide a plurality of acceleration values of an acceleration of the mobile device; a data processor to calculate at least one acceleration metric of the mobile device, based on the plurality of acceleration parameters; and a radio to communicate between the mobile device and a wireless docking device over a docking session via a wireless communication link, and to transmit a message to the wireless docking device via the wireless communication link, the message including the at least one acceleration metric.

Example 62 includes the subject matter of Example 61, and optionally, wherein the at least one acceleration metric comprises at least one vector of acceleration parameters of the mobile device within a moving time window, the at least one vector comprises acceleration parameters in a two-dimensional plane or a three-dimensional space.

Example 63 includes the subject matter of Example 61 or 62, and optionally, wherein the radio is to send the message to the wireless docking device periodically.

Example 64 includes the subject matter of Example 61 or 62, and optionally, wherein the radio is to send the message to the wireless docking device when a quality of the wireless communication link is below a predefined quality threshold.

Example 65 includes a method to be performed at a mobile device, the method comprising communicating over a docking session via a wireless communication link between the mobile device and a wireless docking device; determining a classification of an event of connectivity loss of the wireless communication link as an intentional disconnection or an unintentional disconnection, based on a comparison between at least one acceleration metric of the mobile device and at least one acceleration threshold; and sending to the wireless docking device an indication of the classification of the event of connectivity loss.

Example 66 includes the subject matter of Example 65, and optionally, comprising classifying the event of connectivity loss as an intentional disconnection, if the acceleration metric is greater than the acceleration threshold, and classifying the event of connectivity loss as an unintentional disconnection, if the acceleration metric is less than the acceleration threshold.

Example 67 includes the subject matter of Example 65 or 66, and optionally, comprising updating the at least one acceleration threshold.

Example 68 includes the subject matter of Example 67, and optionally, comprising updating the acceleration threshold based on a correlation between classifications of a plurality of previous events of connectivity loss according to the at least one acceleration threshold, and actual classifications of the plurality of previous events of connectivity loss.

Example 69 includes the subject matter of Example 67, and optionally, comprising updating the acceleration threshold based on a plurality of previous values of the at least one acceleration metric corresponding to a respective plurality of previous events of connectivity loss of the wireless communication link.

Example 70 includes the subject matter of Example 69, and optionally, wherein the plurality of previous values comprises a first plurality of values corresponding to disconnection events, and a second plurality of values corresponding to non-disconnection events, a disconnection event corresponding to a previous connectivity loss event including the wireless communication link remaining disconnected after a predefined disconnection period from the previous connectivity loss event, and a non-disconnection event corresponding to the previous connectivity loss event including restoration of the wireless communication link within the predefined disconnection period.

Example 71 includes the subject matter of any one of Examples 67-70, and optionally, comprising selecting the at least one acceleration metric from a plurality of acceleration metrics.

Example 72 includes the subject matter of any one of Examples 65-71, and optionally, wherein the at least one acceleration metric comprises at least one vector of acceleration parameters of the mobile device within a moving time window, the at least one vector comprises acceleration parameters in a two-dimensional plane or a three-dimensional space.

Example 73 includes the subject matter of any one of Examples 65-72, and optionally, wherein the event of connectivity loss comprises degradation in a quality of the wireless communication link below a predefined quality threshold.

Example 74 includes the subject matter of any one of Examples 65-73, and optionally, comprising processing a plurality of acceleration values of an acceleration of the mobile device, and calculating the at least one acceleration metric based on the plurality of acceleration values.

Example 75 includes the subject matter of Example 74, and optionally, comprising providing the plurality of acceleration values.

Example 76 includes a method to be performed at a wireless docking device, the method comprising communicating over a docking session via a wireless communication link between the wireless docking device and a mobile device; receiving from the mobile device an indication of a classification of an event of connectivity loss of the wireless communication link as an intentional disconnection or an unintentional disconnection; and terminating the docking session based on the classification.

Example 77 includes the subject matter of Example 76, and optionally, comprising terminating the docking session if the event of connectivity loss is classified as an intentional disconnection.

Example 78 includes the subject matter of Example 76 or 77, and optionally, comprising attempting to restore the wireless communication link within a predefined restore period, if the event of connectivity loss is classified as an unintentional disconnection.

Example 79 includes a method to be performed at a wireless docking device, the method comprising communicating over a docking session via a wireless communication link between the wireless docking device and a mobile device; determining a classification of an event of connectivity loss of the wireless communication link as an intentional disconnection or an unintentional disconnection, based on a comparison between at least one acceleration metric of the mobile device and at least one acceleration threshold; and terminating the docking session based on the classification.

Example 80 includes the subject matter of Example 79, and optionally, comprising terminating the docking session, if the event of connectivity loss is classified as an intentional disconnection.

Example 81 includes the subject matter of Example 79 or 80, and optionally, comprising attempting to restore the wireless communication link within a predefined restore period, if the event of connectivity loss is classified as an unintentional disconnection.

Example 82 includes the subject matter of any one of Examples 79-81, and optionally, comprising classifying the event of connectivity loss as an intentional disconnection, if the acceleration metric is greater than the acceleration threshold, and classifying the event of connectivity loss as an unintentional disconnection, if the acceleration metric is less than the acceleration threshold.

Example 83 includes the subject matter of any one of Examples 79-82, and optionally, comprising receiving from the mobile device a message including the acceleration metric.

Example 84 includes the subject matter of any one of Examples 79-83, and optionally, comprising updating the at least one acceleration threshold.

Example 85 includes the subject matter of Example 84, and optionally, comprising updating the acceleration threshold based on a correlation between classifications of a plurality of previous events of connectivity loss according to the at least one acceleration threshold, and actual classifications of the plurality of previous events of connectivity loss.

Example 86 includes the subject matter of Example 84, and optionally, comprising updating the acceleration threshold based on a plurality of previous values of the at least one acceleration metric corresponding to a respective plurality of previous events of connectivity loss of the wireless communication links.

Example 87 includes the subject matter of Example 86, and optionally, wherein the plurality of previous values comprises a first plurality of values corresponding to disconnection events, and a second plurality of values corresponding to non-disconnection events, a disconnection event corresponding to a previous connectivity loss event including the wireless communication link remaining disconnected after a predefined disconnection period from the previous connectivity loss event, and a non-disconnection event corresponding to the previous connectivity loss event including restoration of the wireless communication link within the predefined disconnection period.

Example 88 includes the subject matter of any one of Examples 84-87, and optionally, comprising selecting the at least one acceleration metric from a plurality of acceleration metrics.

Example 89 includes the subject matter of any one of Examples 79-88, and optionally, wherein the at least one acceleration metric comprises at least one vector of acceleration parameters of the mobile device within a moving time window, the at least one vector comprises acceleration parameters in a two-dimensional plane or a three-dimensional space.

Example 90 includes the subject matter of any one of Examples 79-89, and optionally, wherein the event of connectivity loss comprises degradation in a quality of the wireless communication link below a predefined quality threshold.

Example 91 includes a method to be performed at a mobile device, the method comprising communicating between the mobile device and a wireless docking device over a docking session via a wireless communication link; determining a plurality of acceleration values of an acceleration of the mobile device; calculating at least one acceleration metric of the mobile device, based on the plurality of acceleration parameters; and transmitting a message to the wireless docking device via the wireless communication link, the message including the at least one acceleration metric.

Example 92 includes the subject matter of Example 91, and optionally, wherein the at least one acceleration metric comprises at least one vector of acceleration parameters of the mobile device within a moving time window, the at least one vector comprises acceleration parameters in a two-dimensional plane or a three-dimensional space.

Example 93 includes the subject matter of Example 91 or 92, and optionally, comprising sending the message to the wireless docking device periodically.

Example 94 includes the subject matter of Example 91 or 92, and optionally, comprising sending the message to the wireless docking device when a quality of the wireless communication link is below a predefined quality threshold.

Example 95 includes a product including one or more tangible computer-readable non-transitory storage media comprising computer-executable instructions operable to, when executed by at least one computer processor, enable the at least one computer processor to implement a method at a mobile device, the method comprising communicating over a docking session via a wireless communication link between the mobile device and a wireless docking device; determining a classification of an event of connectivity loss of the wireless communication link as an intentional disconnection or an unintentional disconnection, based on a comparison between at least one acceleration metric of the mobile device and at least one acceleration threshold; and sending to the wireless docking device an indication of the classification of the event of connectivity loss.

Example 96 includes the subject matter of Example 95, and optionally, wherein the method comprises classifying the event of connectivity loss as an intentional disconnection, if the acceleration metric is greater than the acceleration threshold, and classifying the event of connectivity loss as an unintentional disconnection, if the acceleration metric is less than the acceleration threshold.

Example 97 includes the subject matter of Example 95 or 96, and optionally, wherein the method comprises updating the at least one acceleration threshold.

Example 98 includes the subject matter of Example 97, and optionally, wherein the method comprises updating the acceleration threshold based on a correlation between classifications of a plurality of previous events of connectivity loss according to the at least one acceleration threshold, and actual classifications of the plurality of previous events of connectivity loss.

Example 99 includes the subject matter of Example 97, and optionally, wherein the method comprises updating the acceleration threshold based on a plurality of previous values of the at least one acceleration metric corresponding to a respective plurality of previous events of connectivity loss of the wireless communication link.

Example 100 includes the subject matter of Example 99, and optionally, wherein the plurality of previous values comprises a first plurality of values corresponding to disconnection events, and a second plurality of values corresponding to non-disconnection events, a disconnection event corresponding to a previous connectivity loss event including the wireless communication link remaining disconnected after a predefined disconnection period from the previous connectivity loss event, and a non-disconnection event corresponding to the previous connectivity loss event including restoration of the wireless communication link within the predefined disconnection period.

Example 101 includes the subject matter of any one of Examples 97-100, and optionally, wherein the method comprises selecting the at least one acceleration metric from a plurality of acceleration metrics.

Example 102 includes the subject matter of any one of Examples 95-101, and optionally, wherein the at least one acceleration metric comprises at least one vector of acceleration parameters of the mobile device within a moving time window, the at least one vector comprises acceleration parameters in a two-dimensional plane or a three-dimensional space.

Example 103 includes the subject matter of any one of Examples 95-102, and optionally, wherein the event of connectivity loss comprises degradation in a quality of the wireless communication link below a predefined quality threshold.

Example 104 includes the subject matter of any one of Examples 95-103, and optionally, wherein the method comprises processing a plurality of acceleration values of an acceleration of the mobile device, and calculating the at least one acceleration metric based on the plurality of acceleration values.

Example 105 includes the subject matter of Example 104, and optionally, wherein the method comprises providing the plurality of acceleration values.

Example 106 includes a product including one or more tangible computer-readable non-transitory storage media comprising computer-executable instructions operable to, when executed by at least one computer processor, enable the at least one computer processor to implement a method at a wireless docking device, the method comprising communicating over a docking session via a wireless communication link between the wireless docking device and a mobile device; receiving from the mobile device an indication of a classification of an event of connectivity loss of the wireless communication link as an intentional disconnection or an unintentional disconnection; and terminating the docking session based on the classification.

Example 107 includes the subject matter of Example 106, and optionally, wherein the method comprises terminating the docking session if the event of connectivity loss is classified as an intentional disconnection.

Example 108 includes the subject matter of Example 106 or 107, and optionally, wherein the method comprises attempting to restore the wireless communication link within a predefined restore period, if the event of connectivity loss is classified as an unintentional disconnection.

Example 109 includes a product including one or more tangible computer-readable non-transitory storage media comprising computer-executable instructions operable to, when executed by at least one computer processor, enable the at least one computer processor to implement a method at a wireless docking device, the method comprising communicating over a docking session via a wireless communication link between the wireless docking device and a mobile device; determining a classification of an event of connectivity loss of the wireless communication link as an intentional disconnection or an unintentional disconnection, based on a comparison between at least one acceleration metric of the mobile device and at least one acceleration threshold; and terminating the docking session based on the classification.

Example 110 includes the subject matter of Example 109, and optionally, wherein the method comprises terminating the docking session, if the event of connectivity loss is classified as an intentional disconnection.

Example 111 includes the subject matter of Example 109 or 110, and optionally, wherein the method comprises attempting to restore the wireless communication link within a predefined restore period, if the event of connectivity loss is classified as an unintentional disconnection.

Example 112 includes the subject matter of any one of Examples 109-111, and optionally, wherein the method comprises classifying the event of connectivity loss as an intentional disconnection, if the acceleration metric is greater than the acceleration threshold, and classifying the event of connectivity loss as an unintentional disconnection, if the acceleration metric is less than the acceleration threshold.

Example 113 includes the subject matter of any one of Examples 109-112, and optionally, wherein the method comprises receiving from the mobile device a message including the acceleration metric.

Example 114 includes the subject matter of any one of Examples 109-113, and optionally, wherein the method comprises updating the at least one acceleration threshold.

Example 115 includes the subject matter of Example 114, and optionally, wherein the method comprises updating the acceleration threshold based on a correlation between classifications of a plurality of previous events of connectivity loss according to the at least one acceleration threshold, and actual classifications of the plurality of previous events of connectivity loss.

Example 116 includes the subject matter of Example 114, and optionally, wherein the method comprises updating the acceleration threshold based on a plurality of previous values of the at least one acceleration metric corresponding to a respective plurality of previous events of connectivity loss of the wireless communication links.

Example 117 includes the subject matter of Example 116, and optionally, wherein the plurality of previous values comprises a first plurality of values corresponding to disconnection events, and a second plurality of values corresponding to non-disconnection events, a disconnection event corresponding to a previous connectivity loss event including the wireless communication link remaining disconnected after a predefined disconnection period from the previous connectivity loss event, and a non-disconnection event corresponding to the previous connectivity loss event including restoration of the wireless communication link within the predefined disconnection period.

Example 118 includes the subject matter of any one of Examples 114-117, and optionally, wherein the method comprises selecting the at least one acceleration metric from a plurality of acceleration metrics.

Example 119 includes the subject matter of any one of Examples 109-118, and optionally, wherein the at least one acceleration metric comprises at least one vector of acceleration parameters of the mobile device within a moving time window, the at least one vector comprises acceleration parameters in a two-dimensional plane or a three-dimensional space.

Example 120 includes the subject matter of any one of Examples 109-119, and optionally, wherein the event of connectivity loss comprises degradation in a quality of the wireless communication link below a predefined quality threshold.

Example 121 includes a product including one or more tangible computer-readable non-transitory storage media comprising computer-executable instructions operable to, when executed by at least one computer processor, enable the at least one computer processor to implement a method at a mobile device, the method comprising communicating between the mobile device and a wireless docking device over a docking session via a wireless communication link; determining a plurality of acceleration values of an acceleration of the mobile device; calculating at least one acceleration metric of the mobile device, based on the plurality of acceleration parameters; and transmitting a message to the wireless docking device via the wireless communication link, the message including the at least one acceleration metric.

Example 122 includes the subject matter of Example 121, and optionally, wherein the at least one acceleration metric comprises at least one vector of acceleration parameters of the mobile device within a moving time window, the at least one vector comprises acceleration parameters in a two-dimensional plane or a three-dimensional space.

Example 123 includes the subject matter of Example 121 or 122, and optionally, wherein the method comprises sending the message to the wireless docking device periodically.

Example 124 includes the subject matter of Example 121 or 122, and optionally, wherein the method comprises sending the message to the wireless docking device when a quality of the wireless communication link is below a predefined quality threshold.

Example 125 includes an apparatus of wireless communication, the apparatus comprising means for communicating over a docking session via a wireless communication link between a mobile device and a wireless docking device; means for determining a classification of an event of connectivity loss of the wireless communication link as an intentional disconnection or an unintentional disconnection, based on a comparison between at least one acceleration metric of the mobile device and at least one acceleration threshold; and means for sending to the wireless docking device an indication of the classification of the event of connectivity loss.

Example 126 includes the subject matter of Example 125, and optionally, comprising means for classifying the event of connectivity loss as an intentional disconnection, if the acceleration metric is greater than the acceleration threshold, and classifying the event of connectivity loss as an unintentional disconnection, if the acceleration metric is less than the acceleration threshold.

Example 127 includes the subject matter of Example 125 or 126, and optionally, comprising means for updating the at least one acceleration threshold.

Example 128 includes the subject matter of Example 127, and optionally, comprising means for updating the acceleration threshold based on a correlation between classifications of a plurality of previous events of connectivity loss according to the at least one acceleration threshold, and actual classifications of the plurality of previous events of connectivity loss.

Example 129 includes the subject matter of Example 127, and optionally, comprising means for updating the acceleration threshold based on a plurality of previous values of the at least one acceleration metric corresponding to a respective plurality of previous events of connectivity loss of the wireless communication link.

Example 130 includes the subject matter of Example 129, and optionally, wherein the plurality of previous values comprises a first plurality of values corresponding to disconnection events, and a second plurality of values corresponding to non-disconnection events, a disconnection event corresponding to a previous connectivity loss event including the wireless communication link remaining disconnected after a predefined disconnection period from the previous connectivity loss event, and a non-disconnection event corresponding to the previous connectivity loss event including restoration of the wireless communication link within the predefined disconnection period.

Example 131 includes the subject matter of any one of Examples 127-130, and optionally, comprising means for selecting the at least one acceleration metric from a plurality of acceleration metrics.

Example 132 includes the subject matter of any one of Examples 125-131, and optionally, wherein the at least one acceleration metric comprises at least one vector of acceleration parameters of the mobile device within a moving time window, the at least one vector comprises acceleration parameters in a two-dimensional plane or a three-dimensional space.

Example 133 includes the subject matter of any one of Examples 125-132, and optionally, wherein the event of connectivity loss comprises degradation in a quality of the wireless communication link below a predefined quality threshold.

Example 134 includes the subject matter of any one of Examples 125-133, and optionally, comprising means for processing a plurality of acceleration values of an acceleration of the mobile device, and means for calculating the at least one acceleration metric based on the plurality of acceleration values.

Example 135 includes the subject matter of Example 134, and optionally, comprising means for providing the plurality of acceleration values.

Example 136 includes an apparatus of wireless communication, the apparatus comprising means for communicating over a docking session via a wireless communication link between a wireless docking device and a mobile device; means for receiving from the mobile device an indication of a classification of an event of connectivity loss of the wireless communication link as an intentional disconnection or an unintentional disconnection; and means for terminating the docking session based on the classification.

Example 137 includes the subject matter of Example 136, and optionally, comprising means for terminating the docking session if the event of connectivity loss is classified as an intentional disconnection.

Example 138 includes the subject matter of Example 136 or 137, and optionally, comprising means for attempting to restore the wireless communication link within a predefined restore period, if the event of connectivity loss is classified as an unintentional disconnection.

Example 139 includes an apparatus of wireless communication, the apparatus comprising means for communicating over a docking session via a wireless communication link between a wireless docking device and a mobile device; means for determining a classification of an event of connectivity loss of the wireless communication link as an intentional disconnection or an unintentional disconnection, based on a comparison between at least one acceleration metric of the mobile device and at least one acceleration threshold; and means for terminating the docking session based on the classification.

Example 140 includes the subject matter of Example 139, and optionally, comprising means for terminating the docking session, if the event of connectivity loss is classified as an intentional disconnection.

Example 141 includes the subject matter of Example 139 or 140, and optionally, comprising means for attempting to restore the wireless communication link within a predefined restore period, if the event of connectivity loss is classified as an unintentional disconnection.

Example 142 includes the subject matter of any one of Examples 139-141, and optionally, comprising means for classifying the event of connectivity loss as an intentional disconnection, if the acceleration metric is greater than the acceleration threshold, and classifying the event of connectivity loss as an unintentional disconnection, if the acceleration metric is less than the acceleration threshold.

Example 143 includes the subject matter of any one of Examples 139-142, and optionally, comprising means for receiving from the mobile device a message including the acceleration metric.

Example 144 includes the subject matter of any one of Examples 139-143, and optionally, comprising means for updating the at least one acceleration threshold.

Example 145 includes the subject matter of Example 144, and optionally, comprising means for updating the acceleration threshold based on a correlation between classifications of a plurality of previous events of connectivity loss according to the at least one acceleration threshold, and actual classifications of the plurality of previous events of connectivity loss.

Example 146 includes the subject matter of Example 144, and optionally, comprising means for updating the acceleration threshold based on a plurality of previous values of the at least one acceleration metric corresponding to a respective plurality of previous events of connectivity loss of the wireless communication links.

Example 147 includes the subject matter of Example 146, and optionally, wherein the plurality of previous values comprises a first plurality of values corresponding to disconnection events, and a second plurality of values corresponding to non-disconnection events, a disconnection event corresponding to a previous connectivity loss event including the wireless communication link remaining disconnected after a predefined disconnection period from the previous connectivity loss event, and a non-disconnection event corresponding to the previous connectivity loss event including restoration of the wireless communication link within the predefined disconnection period.

Example 148 includes the subject matter of any one of Examples 144-147, and optionally, comprising means for selecting the at least one acceleration metric from a plurality of acceleration metrics.

Example 149 includes the subject matter of any one of Examples 139-148, and optionally, wherein the at least one acceleration metric comprises at least one vector of acceleration parameters of the mobile device within a moving time window, the at least one vector comprises acceleration parameters in a two-dimensional plane or a three-dimensional space.

Example 150 includes the subject matter of any one of Examples 139-149, and optionally, wherein the event of connectivity loss comprises degradation in a quality of the wireless communication link below a predefined quality threshold.

Example 151 includes an apparatus of wireless communication, the apparatus comprising means for communicating between a mobile device and a wireless docking device over a docking session via a wireless communication link; means for determining a plurality of acceleration values of an acceleration of the mobile device; means for calculating at least one acceleration metric of the mobile device, based on the plurality of acceleration parameters; and means for transmitting a message to the wireless docking device via the wireless communication link, the message including the at least one acceleration metric.

Example 152 includes the subject matter of Example 151, and optionally, wherein the at least one acceleration metric comprises at least one vector of acceleration parameters of the mobile device within a moving time window, the at least one vector comprises acceleration parameters in a two-dimensional plane or a three-dimensional space.

Example 153 includes the subject matter of Example 151 or 152, and optionally, comprising means for sending the message to the wireless docking device periodically.

Example 154 includes the subject matter of Example 151 or 152, and optionally, comprising means for sending the message to the wireless docking device when a quality of the wireless communication link is below a predefined quality threshold.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A mobile device comprising:
   a radio to communicate over a docking session via a wireless communication link between said mobile device and a wireless docking device; and
   an event classifier to determine a classification of an event of connectivity loss of said wireless communication link as an intentional disconnection or an unintentional disconnection, based on a comparison between at least one acceleration metric of said mobile device and at least one acceleration threshold, and to send to said wireless docking device an indication of the classification of said event of connectivity loss.

2. The mobile device of claim 1, wherein said event classifier is to classify said event of connectivity loss as an intentional disconnection, if said acceleration metric is greater than said acceleration threshold, and to classify said event of connectivity loss as an unintentional disconnection, if said acceleration metric is less than said acceleration threshold.

3. The mobile device of claim 1 comprising a learning module to update said at least one acceleration threshold.

4. The mobile device of claim 3, wherein said learning module is to update said acceleration threshold based on a correlation between classifications of a plurality of previous events of connectivity loss according to said at least one acceleration threshold, and actual classifications of said plurality of previous events of connectivity loss.

5. The mobile device of claim 3, wherein said learning module is to update said acceleration threshold based on a plurality of previous values of said at least one acceleration metric corresponding to a respective plurality of previous events of connectivity loss of said wireless communication link.

6. The mobile device of claim 5, wherein said plurality of previous values comprises a first plurality of values corresponding to disconnection events, and a second plurality of values corresponding to non-disconnection events, a disconnection event corresponding to a previous connectivity loss event including said wireless communication link remaining disconnected after a predefined disconnection period from said previous connectivity loss event, and a non-disconnection event corresponding to said previous connectivity loss event including restoration of said wireless communication link within said predefined disconnection period.

7. The mobile device of claim 3, wherein said learning module is to select said at least one acceleration metric from a plurality of acceleration metrics.

8. The mobile device of claim 1, wherein said at least one acceleration metric comprises at least one vector of acceleration parameters of said mobile device within a moving time window, said at least one vector comprises acceleration parameters in a two-dimensional plane or a three-dimensional space.

9. The mobile device of claim 1, wherein said event of connectivity loss comprises degradation in a quality of said wireless communication link below a predefined quality threshold.

10. The mobile device of claim 1 comprising a data processor to process a plurality of acceleration values of an acceleration of said mobile device, and to calculate said at least one acceleration metric based on said plurality of acceleration values.

11. The mobile device of claim 1 comprising:
    one or more antennas;
    a memory; and
    a processor.

12. A wireless docking device comprising:
    a radio to communicate over a docking session via a wireless communication link between said wireless docking device and a mobile device;
    an event classifier to determine a classification of an event of connectivity loss of said wireless communication link as an intentional disconnection or an unintentional disconnection, based on a comparison between at least one acceleration metric of said mobile device and at least one acceleration threshold; and
    a session manager to terminate said docking session based on said classification.

13. The wireless docking device of claim 12, wherein said session manager is to terminate said docking session, if said event of connectivity loss is classified as an intentional disconnection.

14. The wireless docking device of claim 12, wherein said session manager is to attempt to restore said wireless communication link within a predefined restore period, if said event of connectivity loss is classified as an unintentional disconnection.

15. The wireless docking device of claim 12, wherein said event classifier is to classify said event of connectivity loss as an intentional disconnection, if said acceleration metric is greater than said acceleration threshold, and to classify said event of connectivity loss as an unintentional disconnection, if said acceleration metric is less than said acceleration threshold.

16. The wireless docking device of claim 12, wherein said event classifier is to receive from said mobile device a message including said acceleration metric.

17. The wireless docking device of claim 12 comprising a learning module to update said at least one acceleration threshold.

18. The wireless docking device of claim 17, wherein said learning module is to update said acceleration threshold based on a correlation between classifications of a plurality of previous events of connectivity loss according to said at least one acceleration threshold, and actual classifications of said plurality of previous events of connectivity loss.

19. A product including one or more tangible computer-readable non-transitory storage media comprising computer-executable instructions operable to, when executed by at least one computer processor, enable the at least one computer processor to implement operations at a wireless docking device, the operations comprising:
communicating over a docking session via a wireless communication link between said wireless docking device and a mobile device;
receiving from said mobile device an indication of a classification of an event of connectivity loss of said wireless communication link as an intentional disconnection or an unintentional disconnection, the classification of the event is based on a comparison between at least one acceleration metric of said mobile device and at least one acceleration threshold; and
terminating said docking session based on said classification.

20. The product of claim 19, wherein said operations comprise terminating said docking session if said event of connectivity loss is classified as an intentional disconnection.

21. The product of claim 19, wherein said operations comprise attempting to restore said wireless communication link within a predefined restore period, if said event of connectivity loss is classified as an unintentional disconnection.

* * * * *